United States Patent
Tian et al.

(10) Patent No.: US 12,396,591 B2
(45) Date of Patent: Aug. 26, 2025

(54) COOKING APPARATUS AND CONTROL METHOD, CONTROL DEVICE, AND STORAGE MEDIUM THEREOF

(71) Applicant: FOSHAN SHUNDE MIDEA ELECTRICAL HEATING APPLIANCES MANUFACTURING CO., LTD., Foshan (CN)

(72) Inventors: Maoqiao Tian, Foshan (CN); Yongdong Ai, Foshan (CN); Xiang Wu, Foshan (CN); Longjian Xuan, Foshan (CN); Jie Li, Foshan (CN); Wei Chen, Foshan (CN); Xiaohui Li, Foshan (CN); Biao Wang, Foshan (CN); Sheng Zhou, Foshan (CN); Xianxin Meng, Foshan (CN); Yanxia Zeng, Foshan (CN); Fuxing Yang, Foshan (CN); Wenqi Tian, Foshan (CN); Weijie Lu, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 493 days.

(21) Appl. No.: 17/626,643

(22) PCT Filed: Nov. 8, 2019

(86) PCT No.: PCT/CN2019/116712
§ 371 (c)(1),
(2) Date: Jan. 12, 2022

(87) PCT Pub. No.: WO2021/031388
PCT Pub. Date: Feb. 25, 2021

(65) Prior Publication Data
US 2022/0257052 A1    Aug. 18, 2022

(30) Foreign Application Priority Data

Aug. 16, 2019 (CN) .......................... 201910757428.3
Sep. 29, 2019 (CN) .......................... 201910935504.5

(51) Int. Cl.
*A47J 36/32* (2006.01)
*G05B 19/042* (2006.01)

(52) U.S. Cl.
CPC .......... *A47J 36/32* (2013.01); *G05B 19/0423* (2013.01); *G05B 2219/2643* (2013.01)

(58) Field of Classification Search
CPC ................. A47J 36/32; G05B 19/0423; G05B 2219/2643
See application file for complete search history.

(56) References Cited

U.S. PATENT DOCUMENTS 4,503,502 A * 3/1985 Chapin .................. A47J 27/14
99/335
5,809,994 A 9/1998 Maher, Jr.
(Continued)

FOREIGN PATENT DOCUMENTS

| CN | 101431228 A | 5/2009 |
| CN | 101669760 A | 3/2010 |

(Continued)

OTHER PUBLICATIONS

English translation JP2000300431A; Google patents; Okuno, Tomia; Oct. 31, 2000; 6 pgs. (Year: 2000).*

(Continued)

*Primary Examiner* — Steven N Leff
(74) *Attorney, Agent, or Firm* — Anova Law Group, PLLC

(57) ABSTRACT

A method for controlling a cooking apparatus includes counting a number of times that an operation temperature of the cooking apparatus exceeds a set temperature within a
(Continued)

previous set duration, updating a control parameter corresponding to a current set duration based on the number of times, and controlling a heating device of the cooking apparatus to heat within the current set duration based on the updated control parameter.

12 Claims, 16 Drawing Sheets

(56) References Cited

U.S. PATENT DOCUMENTS

| | | | | |
|---|---|---|---|---|
| 5,981,916 | A | * | 11/1999 | Griffiths ............... H05B 3/746 219/448.12 |
| 2008/0274240 | A1 | * | 11/2008 | Germouni ............ G01N 33/02 700/207 |
| 2013/0052310 | A1 | * | 2/2013 | Stanford ................ A23L 5/11 99/333 |
| 2013/0202761 | A1 | * | 8/2013 | McKee .................. F24C 7/088 426/523 |
| 2016/0169752 | A1 | * | 6/2016 | Sun ....................... G01K 11/20 99/331 |
| 2016/0345612 | A1 | * | 12/2016 | Banerjee .................. A23L 3/36 |
| 2017/0000283 | A1 | * | 1/2017 | Choi ...................... A47J 27/00 |
| 2017/0354287 | A1 | * | 12/2017 | Chang ..................... H05B 6/12 |

FOREIGN PATENT DOCUMENTS

| | | | |
|---|---|---|---|
| CN | 203916508 | U | 11/2014 |
| CN | 104918342 | A | 9/2015 |
| CN | 105078233 | A | 11/2015 |
| CN | 105231858 | A | 1/2016 |
| CN | 105588255 | A | 5/2016 |
| CN | 205458024 | U | 8/2016 |
| CN | 106998060 | A | 8/2017 |
| CN | 107048976 | A | 8/2017 |
| CN | 107296478 | A | 10/2017 |
| CN | 107544586 | A | 1/2018 |
| CN | 107581887 | A | 1/2018 |
| CN | 107817702 | A | 3/2018 |
| CN | 108143252 | A | 6/2018 |
| CN | 108272336 | A | 7/2018 |
| CN | 108378676 | A | 8/2018 |
| CN | 108681283 | A | 10/2018 |
| CN | 109376819 | A | 2/2019 |
| CN | 109907643 | A | 6/2019 |
| CN | 109945260 | A | 6/2019 |
| CN | 110089922 | A | 8/2019 |
| CN | 110089931 | A | 8/2019 |
| JP | 2000300431 | A * | 10/2000 .............. A47J 36/32 |
| JP | 2012049059 | A | 3/2012 |
| JP | 2014105961 | A | 6/2014 |
| JP | 2017227406 | A | 12/2017 |
| WO | 9817159 | A1 | 4/1998 |
| WO | 2018006778 | A1 | 1/2018 |
| WO | 2018079806 | A1 | 5/2018 |

OTHER PUBLICATIONS

World Intellectual Property Organization (WIPO) International Search Report and Written Opinion for PCT/CN2019/116712 May 22, 2020 18 Pages (with translation).
The China National Intelleectual Property Administration (CNIPA) The First Office Action for 201910935504.5 Aug. 18, 2021 18 Pages (with translation).
The China National Intelleectual Property Administration (CNIPA) The First Office Action for 201910757428.3 May 6, 2021 12 Pages (with translation).
Min Xiong et al., 'Foreign cooking equipment for use', p. 20-21, China Food.
The China National Intelleectual Property Administration (CNIPA) The Notification to Grant Patent Right for Invention for 201910757428.3 Jan. 13, 2022 6 Pages (with translation).
The China National Intelleectual Property Administration (CNIPA) The Second Office Action for 201910935504.5 Mar. 9, 2022 15 Pages (with translation).
The European Patent Office (EPO) Extended Search Report for EP Application No. 19941922.7 Oct. 17, 2022 10 pages.
The European Patent Office (EPO) The Communication pursuant to Article 94(3) EPC for Application No. 19941922.7 Nov. 19, 2024 7 Pages.

* cited by examiner

COOKING APPARATUS AND CONTROL METHOD, CONTROL DEVICE, AND STORAGE MEDIUM THEREOF

CROSS-REFERENCE TO RELATED APPLICATIONS

This application is a National Stage Entry under 35 U.S.C. § 371 of International Application No. PCT/CN2019/116712, filed on Nov. 8, 2019, which is based upon and claims priority to Chinese Patent Application No. 201910757428.3, filed on Aug. 16, 2019, and Chinese Patent Application No. 201910935504.5, filed on Sep. 29, 2019, the contents of which are incorporated herein by reference in their entirety.

TECHNICAL FIELD

The disclosure relates to the field of cooking apparatuses, and in particular to a cooking apparatus and a control method, a control device and a storage medium thereof.

BACKGROUND

In order to ensure that the cooked food does not stick to the pot, a cooking apparatus, such as an automatic cooker or an induction hob, sets a protection temperature in the heating process to prevent the food from sticking to the pot due to excessive heating temperature. However, in the cooking process of the stir-fried food, there is often insufficient cooking firepower, which is difficult to meet the cooking requirements.

On the other hand, among young people, there are fewer people who have experience in cooking or stir-frying. On weekdays, young people are used to eating coarse grains in the company canteen. Even if young people have time on weekends and want to cook to change their tastes, they often don't know how to choose ingredients. After the ingredients are prepared, it is often hard for young people to start cooking. Finally, young people often eat out or eat through takeout, thus their diet is not healthy enough. Therefore, it is very important to use intelligent control cooking apparatus for cooking. However, in the related art, the cooking control method of cooking apparatus needs to be optimized.

SUMMARY

In view of the above, embodiments of the disclosure provide a cooking apparatus and a control method, a control device and a storage medium thereof.

The technical solution of embodiments of the disclosure is realized as follows.

In a first aspect, an embodiment of the disclosure provides a method for controlling a cooking apparatus, which includes the following operations.

A number of times that an operation temperature of the cooking apparatus exceeds a set temperature within a previous set duration is counted, and a control parameter corresponding to a current set duration is updated based on the number of times.

A heating device of the cooking apparatus is controlled to heat within the current set duration based on the updated control parameter.

An embodiment of the disclosure further provides a control device of a cooking apparatus, which includes an adjustment module and a heating control module.

The adjustment module is configured to count the number of times that an operation temperature of the cooking apparatus exceeds a set temperature within a previous set duration, and to update a control parameter corresponding to a current set duration based on the number of times.

The heating control module is configured to control a heating device of the cooking apparatus to heat within the current set duration based on the updated control parameter.

An embodiment of the disclosure further provides a cooking apparatus, which includes a processor and a memory configured to store computer programs executable on the processor.

The processor is configured to perform steps of the method according to the embodiments of the disclosure when executing the computer programs.

An embodiment of the disclosure further provides a storage medium having stored thereon computer programs that when executed by a processor, perform steps of the method according to the embodiments of the disclosure.

According to the technical solution provided in the embodiments of the disclosure, the number of times that the operation temperature of the cooking apparatus exceeds the set temperature within the previous set duration is counted, and the control parameter corresponding to the current set duration updated based on the number of times, so that it is determined whether there is a stir-frying operation according to the number of times that the operation temperature of the cooking apparatus exceeds the set temperature within the previous set duration, and the control parameter corresponding to the current set duration is updated according to the determined result. Therefore, the cooking apparatus can automatically identify the stir-frying operation and adjust the control parameter, so as to meet the heating control requirements for the cooking apparatus during the stir-frying operation, which is beneficial to improve the heating effect in the cooking process of the stir-fried food.

In a second aspect, an embodiment of the disclosure provides a cooking control method, which includes the following operations.

A first instruction configured to instruct a cooking apparatus to cook is received.

Responsive to the first instruction, at least one cooking curve corresponding to a cooking process indicated by the first instruction is determined. The cooking curve characterizes correspondences between a cooking time, a cooking temperature and a heating power. Each cooking curve includes at least two temperature ranges and the heating power corresponding to each of the temperature ranges.

A cooking parameter of the cooking apparatus is monitored. The cooking parameter includes a cooking time parameter and a cooking temperature parameter.

A heating power of the cooking apparatus is determined based on the monitored cooking parameter and the at least one cooking curve. The cooking apparatus is controlled to cook at the determined heating power.

An embodiment of the disclosure further provides a cooking control device, which includes a first receiving module, a first determining module, a first monitoring module, a second determining module and a first control module.

The first receiving module is configured to receive a first instruction. The first instruction is configured to instruct a cooking apparatus to cook.

The first determining module is configured to determine at least one cooking curve corresponding to a cooking process indicated by the first instruction responsive to the first instruction. The cooking curve characterizes correspondences between a cooking time, a cooking temperature and a heating power. Each cooking curve includes at least two temperature ranges and the heating power corresponding to each of the temperature ranges.

The first monitoring module is configured to monitor a cooking parameter of the cooking apparatus. The cooking parameter includes a cooking time parameter and a cooking temperature parameter.

The second determining module is configured to determine a heating power of the cooking apparatus based on the monitored cooking parameter and the at least one cooking curve.

The first control module is configured to control the cooking apparatus to cook at the determined heating power.

An embodiment of the disclosure further provides a cooking control device, which includes a processor and a memory configured to store computer programs executable on the processor.

The processor is configured to perform steps of the method according to the embodiments of the disclosure when executing the computer programs.

An embodiment of the disclosure further provides a storage medium having stored thereon computer programs that when executed by a processor, performs steps of the method according to the embodiments of the disclosure.

According to the technical solution provided in the embodiments of the disclosure, the first instruction configured to instruct the cooking apparatus to cook is received. Responsive to the first instruction, at least one cooking curve corresponding to the cooking process indicated by the first instruction is determined. The cooking curve characterizes correspondences between the cooking time, the cooking temperature and the heating power. Each cooking curve includes at least two temperature ranges and the heating power corresponding to each of the temperature ranges. The cooking parameter of the cooking apparatus is monitored. The cooking parameter includes the cooking time parameter and the cooking temperature parameter. The heating power of the cooking apparatus is determined based on the monitored cooking parameter and the at least one cooking curve. The cooking apparatus is controlled to cook at the determined heating power. According to the technical solution of the embodiments of the disclosure, the cooking process can correspond to multiple cooking curves. Each cooking curve includes at least two temperature ranges and the heating power corresponding to each of the temperature ranges. The heating power of the cooking apparatus is determined based on the respective cooking curve by monitoring the cooking parameter. Thus, the heating power of the cooking apparatus can be accurately controlled, the mouthfeel of the cooked food can be improved, and the user experience can be improved.

DETAILED DESCRIPTION

The disclosure will be further described in detail below in combination with the drawings and the embodiments.

Unless defined otherwise, all technical and scientific terms used herein have the same meaning as commonly understood by one of ordinary skill in the art to which the disclosure belongs. The terminology used in the specification of the disclosure is for the purpose of describing specific embodiments only and is not intended to be limiting of the disclosure.

Figure 1:
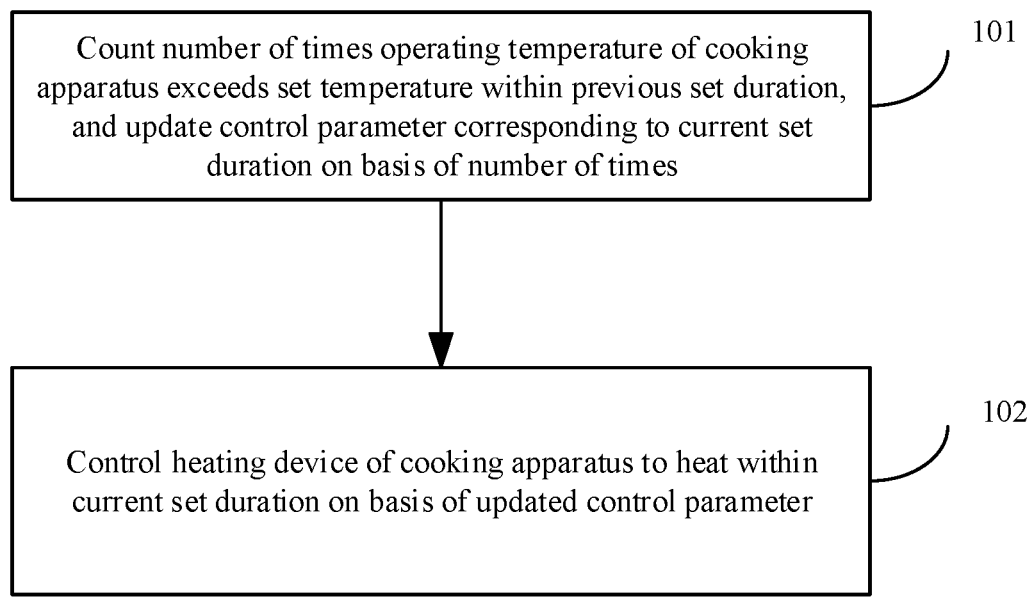
FIG. 1 is a schematic flow diagram of a method for controlling a cooking apparatus according to an embodiment of the disclosure.

In a first aspect, as shown in FIG. 1, an embodiment of the disclosure provides a method for controlling a cooking apparatus, which includes the following operations.

In operation 101, the number of times that an operation temperature of the cooking apparatus exceeds a set temperature within a previous set duration is counted, and a control parameter corresponding to a current set duration is updated based on the number of times.

In an embodiment of the disclosure, the cooking apparatus may be a cooking appliance such as an induction hob or an automatic cooker. The cooking apparatus includes a heating device configured to provide a heating source, a temperature detection device configured to detect a temperature near the heating source (such as a temperature of a pot body), and a control device configured to control the heating device to operate according to a set control parameter. Taking an induction hob as an example, the heating device of the induction hob heats based on an electromagnetic induction principle, and the control device may control the heating device to operate based on a set heating power.

In the embodiments of the disclosure, the control device periodically controls the heating device of the cooking apparatus to heat based on the control parameter within a set duration, taking the set duration as a period. The set duration may be set based on a desired control frequency. Exemplarily, the set duration is any duration ranging from 1 minute to 5 minutes. The set duration may be a constant value or a variable value, that is, two adjacent set duration may be equal or different from each other.

The control device may, within the previous set duration, receive the operation temperature of the cooking apparatus detected by the temperature detection device, and count the number of times that the operation temperature of the cooking apparatus exceeds the set temperature. It is determined whether there is a stir-frying (manual stir-frying or automatic stir-frying) operation according to the number of times, and update the control parameter corresponding to the current set duration according to the determined result of whether there is a stir-frying operation. The control parameter includes at least a heating power for controlling the heating of the heating device and the set temperature for temperature protection. Specifically, when it is determined that there is a stir-frying operation, both the heating power for controlling the heating device and the set temperature for temperature protection in the control parameter are increased to update the control parameter.

In operation 102, the heating device of the cooking apparatus is controlled to heat within the current set duration based on the updated control parameter.

The control device controls the heating device of the cooking apparatus to heat based on the updated control parameter. In this way, when it is determined that there is a stir-frying operation, the heating power of the heating device can be increased, and the set temperature corresponding to the temperature protection is increased, which is beneficial to improve the heating effect in the cooking process of the stir-fried food.

According to the embodiments of the disclosure, the number of times that the operation temperature of the cooking apparatus exceeds the set temperature within the previous set duration is counted, and the control parameter corresponding to the current set duration is updated based on the number of times, so that it is determined whether there is a stir-frying operation according to the number of times that the operation temperature of the cooking apparatus exceeds the set temperature within the previous set duration, and the control parameter corresponding to the current set duration is updated according to the determined result. Therefore, the cooking apparatus can automatically identify the stir-frying operation and adjust the control parameter, so as to meet the heating control requirements for the cooking apparatus during the stir-frying operation, which is beneficial to improve the heating effect in the cooking process of the stir-fried food.

Figure 2:
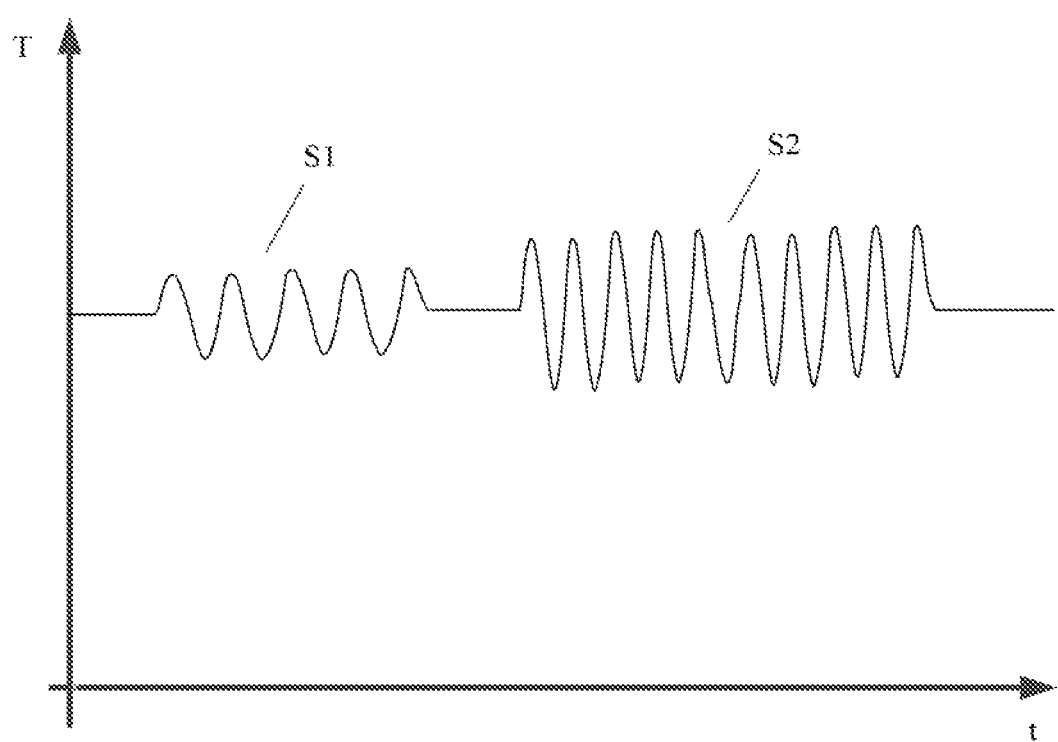
FIG. 2 is a schematic diagram of a heating curve of a cooking apparatus according to an embodiment of the disclosure.

FIG. 2 shows a schematic diagram of a heating curve of a cooking apparatus in an embodiment, a horizontal axis represents time (t) and a vertical axis represents the detected operation temperature (T). As shown in FIG. 2, when the cooking apparatus operates in the non-stir-frying stage S1, the soup on the food causes the fluctuation in the operation temperature of the cooking apparatus to be small, and the fluctuation frequency in the operation temperature of the cooking apparatus to be small. When the cooking apparatus operates in the stir-frying stage S2, the stir-frying operation in the heating process causes the fluctuation in the operation temperature of the cooking apparatus to be large, and the fluctuation frequency in the operation temperature of the cooking apparatus to be large.

According to the embodiments of the disclosure, it is determined whether there is a stir-frying operation based on the number of times that the operation temperature of the cooking apparatus exceeds the set temperature within the previous set duration, and the control parameter corresponding to the current set duration is updated according to the determined result. Specifically, when it is determined that there is a stir-frying operation, both the heating power for controlling the heating device and the set temperature for temperature protection in the control parameter are increased to update the control parameter, and the heating device is controlled to operate within the current set duration according to the updated control parameter. In this way, the cooking apparatus can intelligently identify the stir-frying stage and increase the heating power and the set temperature corresponding to the stir-frying stage when cooking the stir-fried food, so that the cooking firepower can be increased and frequent stopping heating caused by the low set temperature corresponding to the temperature protection can be avoided, thereby greatly improving the heating effect in the cooking process of the stir-fried food.

In an embodiment, the control parameter includes a first temperature value Tep1, a second temperature value Tep2, a first heating power P1 and a second heating power P2. The operation that the heating device of the cooking apparatus is controlled to heat within the current set duration based on the updated control parameter includes the following operations.

Responsive to determining that the operation temperature of the cooking apparatus is less than or equal to Tep1, the heating device is controlled to heat at P1.

Responsive to determining that the operation temperature of the cooking apparatus is greater than Tep1 and less than or equal to Tep2, the heating device is controlled to heat at P2.

Responsive to determining that the operation temperature of the cooking apparatus is greater than Tep2, the heating device is controlled to stop heating.

Tep1 characterizes a maximum temperature value corresponding to rapid heating, Tep2 characterizes a maximum temperature value corresponding to slow heating, P1 characterizes a power corresponding to the rapid heating, and P2 characterizes a power corresponding to the slow heating.

In the practical application, Tep2 is greater than Tep1, and the difference between Tep2 and Tep1 is the difference corresponding to temperature fluctuation. Tep1 can be set based on the rated power of the cooking apparatus, and Tep2 can be set reasonably based on Tep1 and the temperature fluctuation error of cooking apparatus. P1 is greater than P2, so that the heating device can rapidly heat to Tep1 at P1 as the heating power, and then enter the slow heating stage, the heating device heats to Tep2 at P2. When the operation temperature is greater than Tep2, the heating device stops heating. During operation of the heating device, the temperature detection device detects the operation temperature of the cooking apparatus in real time at a set acquisition frequency (for example, once per second), and the control device controls the heating device to perform the above-described respective operation according to the operation temperature detected by the temperature detection device and based on the range in which the operation temperature is located.

In an embodiment, the operation that the number of times that the operation temperature of the cooking apparatus exceeds the set temperature within the previous set duration is counted includes the following operations.

Responsive to determining that the operation temperature of the cooking apparatus is greater than the set temperature, a count of a counter is increased by one.

The number of times is determined according to the count of the counter within the previous set duration.

In the practical application, the control device can time by a timer and count the number of times that the operation temperature exceeds the set temperature (such as the second temperature value) by the counter. When the timing of the timer reaches the set duration, the timer and the counter are reset to enter the counting of the next period.

In an embodiment, the operation that the control parameter corresponding to the current set duration is updated based on the number of times includes the following operations.

In a case that the number of times is less than or equal to a set number, it is determined that the cooking apparatus is in a first state (non-stir-frying state), and the control parameter is set to be a set value corresponding to the first state.

In a case that the number of times is greater than the set number, it is determined that the cooking apparatus is in a second state (stir-frying state), and the control parameter is set to be a set value corresponding to the second state.

In the practical application, comparing the set value corresponding to the control parameter in the stir-frying state with the set value corresponding to the control parameter in the non-stir-frying state, the heating power and the set temperature corresponding to the temperature protection in the stir-frying state are increased, so as to improve the heating effect in the stir-frying state and minimize the influence of frequent stopping heating on firepower.

In an embodiment, the operation that the control parameter corresponding to the current set duration is updated based on the number of times includes the following operations.

The control parameter corresponding to the current set duration is determined based on the number of times according to a mapping table of a mapping relation between the number of times and the control parameter.

In the practical application, the control parameter includes a heating power for controlling the heating of the heating device and the set temperature for temperature protection. There is a preset mapping relation between the control parameter and the number of times, which is stored in the form of the mapping table. The heating power and the set temperature can increase with the increase of the number of times and decrease with the decrease of the number of times. In this way, when the control device updates the control parameter corresponding to the current set duration based on the number of times, the heating power and the set temperature corresponding to the current set duration in the mapping table can be determined based on the number of times, thereby updating the control parameter, so that the adjustment of control parameter is more flexible, so as to better meet the heating requirements for the cooking apparatus during stir-frying.

The disclosure will be further described in detail below in combination with the embodiments.

Figure 3:
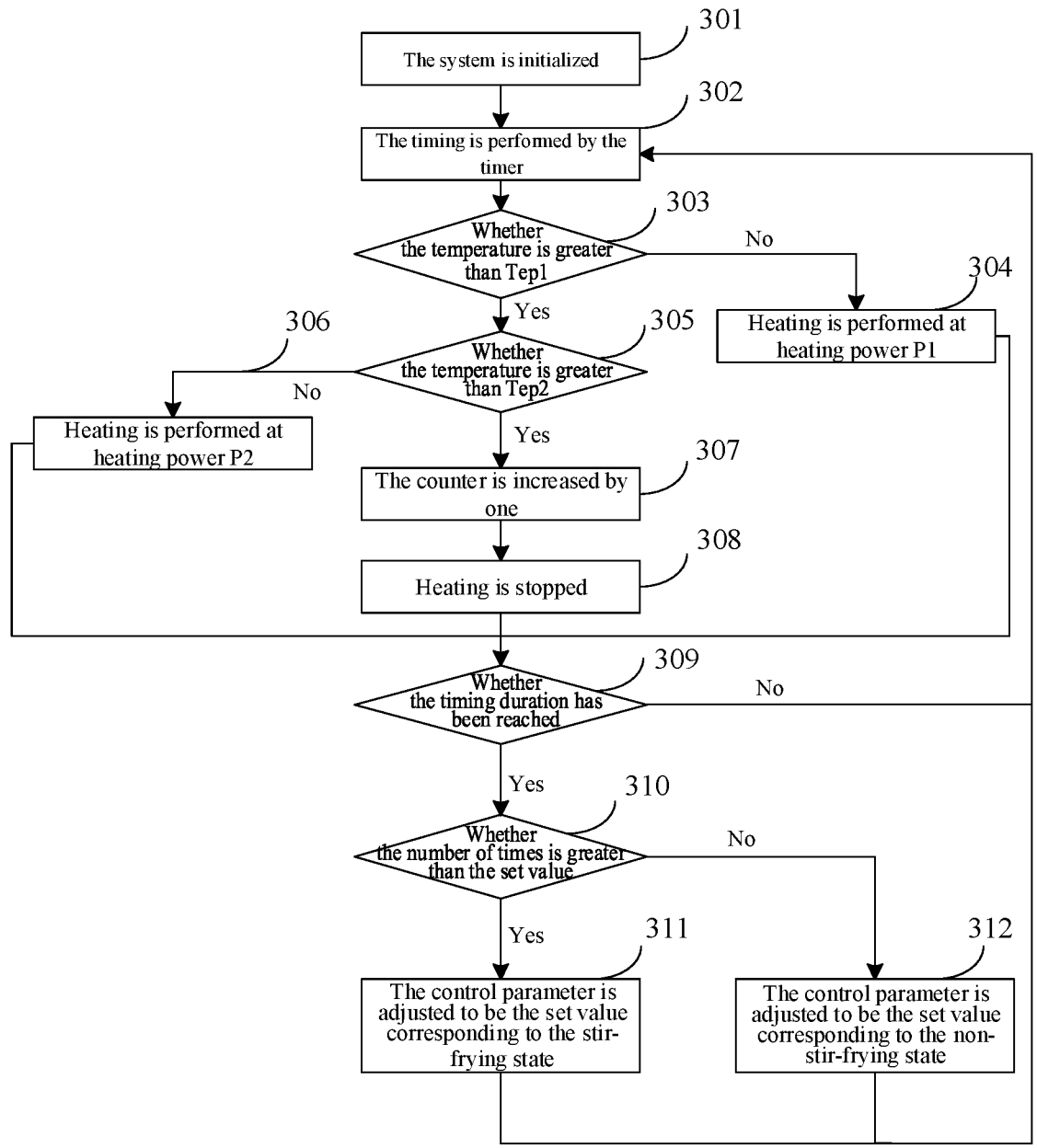
FIG. 3 is a schematic flow diagram of a method for controlling a cooking apparatus according to an embodiment of the disclosure.

As shown in FIG. 3, in an embodiment, the method for controlling the cooking apparatus includes the following operations.

In operation 301, the system is initialized.

After the cooking apparatus is powered on, the system can be initialized, and the control parameter of the cooking apparatus can be set. The control parameter includes a first temperature value Tep1, a second temperature value Tep2, a first heating power P1 and a second heating power P2. Tep1 can be set based on the rated power of the cooking apparatus, Tep2 is greater than Tep1 and Tep2 is a sum of Tep1 and the temperature fluctuation difference, P2 is any value less than P1. The timer t1 and the counter Cnt1 can also be set and t1 and Cnt1 can be reset during the initialization.

In operation 302, timing is performed by the timer is performed.

After the heating device is started, the timer t1 is triggered to start timing, and the temperature detection device is triggered to detect the operation temperature of the cooking apparatus in real time at a set frequency and transmit the operation temperature to the control device.

In operation 303, it is determined whether the temperature is greater than Tep1.

The control device determines whether the current operation temperature is greater than Tep1. In a case that the current operation temperature is not greater than Tep1, operation 304 is performed, and in a case that the current operation temperature is greater than Tep1, operation 305 is performed.

In operation 304, heating is performed at heating power P1.

The control device controls the heating device to heat at P1 as the heating power. Thereafter, operation 309 is performed.

In operation 305, it is determined whether the temperature is greater than Tep2.

The control device determines whether the current operation temperature is greater than Tep2. In a case that the current operation temperature is not greater than Tep2, operation 306 is performed, and in a case that the current operation temperature is greater than Tep2, operation 307 is performed.

In operation 306, heating is performed at heating power P2.

The control device controls the heating device to heat at P2 as the heating power. Thereafter, operation 309 is performed.

In operation 307, the counter is increased by one, i.e., the count of the counter is increased by one.

When the control device determines that the current operation temperature is greater than Tep2, Cnt1 is increased by one to count the number of times that the operation temperature exceeds Tep2.

In operation 308, heating is stopped.

When the control device determines that the current operation temperature is greater than Tep2, the control device controls the heating device to stop heating. Thereafter, operation 309 is performed.

In operation 309, it is determined whether the timing duration has been reached. In a case that the timing duration has been reached, operation 310 is performed, and in a case that the timing duration has not been reached, operation 302 is performed.

When the set duration of the timer t1 has been reached, that is, when the timer times out, which indicates that the current period has ended, operation 310 is performed. When the set duration of the timer t1 has not been reached, operation 302 is returned to until the current period has ended.

In operation 310, it is determined whether the number of times is greater than the set number. In a case that the number of times is greater than the set number, operation 311 is performed, and in a case that the number of times is not greater than the set number, operation 312 is performed.

In operation 311, the control parameter is adjusted to be the set value corresponding to the stir-frying state.

When the control device determines that the number of times counted by Cnt1 is greater than the set number, it is determined that there is a stir-frying operation. The control parameter is adjusted to be the set value corresponding to the stir-frying state, and the timer and the counter are reset. Thereafter, operation 302 is returned to. At least one of the first temperature value Tep1, the second temperature value Tep2, the first heating power P1 or the second heating power P2 can be increased. For example, P1 can be increased and Tep1 and Tep2 can be increased, so that the cooking firepower can be increased in the stir-frying stage, and frequent stopping heating caused by the low set temperature corresponding to the temperature protection can be avoided, thereby greatly improving the heating effect in the cooking process of the stir-fried food.

In operation 312, the control parameter is adjusted to be the set value corresponding to the non-stir-frying state.

When the control device determines that the number of times counted by Cnt1 is less than or equal to the set number, it is determined that there is no stir-frying operation. The control parameter is adjusted to be the set value corresponding to the non-stir-frying state, and the timer and the counter are reset. Thereafter, operation 302 is returned to. The control parameter can be adjusted to be a value corresponding to the system initialization.

Figure 4:
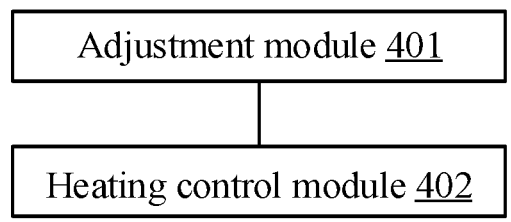
FIG. 4 is a schematic structural diagram of a control device of a cooking apparatus according to an embodiment of the disclosure.

In order to implement the method of the embodiments of the disclosure described above, an embodiment of the disclosure further provides a control device of a cooking apparatus, which includes an adjustment module 401 and a heating control module 402, as shown in FIG. 4.

The adjustment module 401 is configured to count the number of times that an operation temperature of the cooking apparatus exceeds a set temperature within a previous set duration, and to update a control parameter corresponding to a current set duration based on the number of times.

The heating control module 402 is configured to control a heating device of the cooking apparatus to heat within the current set duration based on the updated control parameter.

In an embodiment, the control parameter includes a first temperature value, a second temperature value, a first heating power and a second heating power. The heating control module 402 is configured to perform the following operations.

Responsive to determining that the operation temperature of the cooking apparatus is less than or equal to the first temperature value, the heating device is controlled to heat at a first set power.

Responsive to determining that the operation temperature of the cooking apparatus is greater than the first temperature value and less than or equal to the second temperature value, the heating device is controlled to heat at a second set power.

Responsive to determining that the operation temperature of the cooking apparatus is greater than the second temperature value, the heating device is controlled to stop heating.

The first temperature value characterizes a maximum temperature value corresponding to rapid heating, the second temperature value characterizes a maximum temperature value corresponding to slow heating, the first heating power characterizes a power corresponding to the rapid heating, and the second heating power characterizes a power corresponding to the slow heating.

In an embodiment, the adjustment module 401 is configured to perform the following operations.

Responsive to determining that the operation temperature of the cooking apparatus is greater than the set temperature, a count of a counter is increased by one.

The number of times is determined according to the count of the counter within the previous set duration.

In an embodiment, the adjustment module 401 is configured to perform the following operations.

In a case that the number of times is less than or equal to a set number, it is determined that the cooking apparatus is in a first state, and the control parameter is set to be a set value corresponding to the first state.

In a case that the number of times is greater than the set number, it is determined that the cooking apparatus is in a second state, and the control parameter is set to be a set value corresponding to the second state.

In an embodiment, the adjustment module 401 is configured to perform the following operations.

The control parameter corresponding to the current set duration is determined based on the number of times according to a mapping table of a mapping relation between the number of times and the control parameter.

In the practical application, the adjustment module 401 and the heating control module 402 may be implemented by a processor in the control device. Of course, the processor needs to execute computer programs in a memory to implement its functions.

It should be noted that when the control device of the cooking apparatus provided in the above embodiment controls the cooking apparatus, only the division of each program module is given as an example. In the practical application, the processing assignment may be performed by different program modules as desired, that is, the internal structure of the device is divided into different program modules to perform all or part of the processing described above. In addition, the control device of the cooking apparatus provided in the above embodiment belongs to the same concept as the method embodiment for controlling the cooking apparatus, the detailed implementation of which can be found in the method embodiment and will not be repeated herein.

Figure 5:
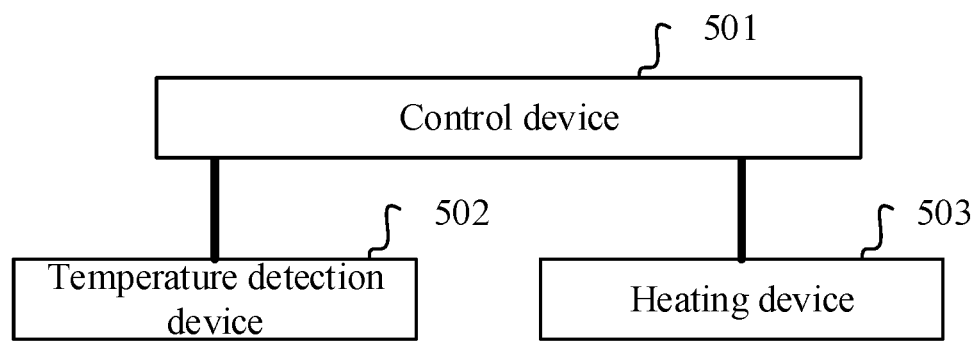
FIG. 5 is a schematic structural diagram of a cooking apparatus according to an embodiment of the disclosure.

An embodiment of the disclosure further provides a cooking apparatus based on the hardware implementation of the program module and in order to implement the method of the embodiments of the disclosure. FIG. 5 shows only an exemplary structure of the apparatus and not all of the structure, part or all of the structure shown in FIG. 5 may be implemented as desired.

As shown in FIG. 5, the cooking apparatus provided in the embodiments of the disclosure includes a control device 501, a temperature detection device 502 and a heating device 503. The heating device 503 is configured to provide a heating source, the temperature detection device 502 is configured to detect a temperature near the heating source, and the control device 501 is configured to control the heating device to operate according to a set operating parameter.

The method for controlling the cooking apparatus disclosed in the embodiments of the disclosure may be applied to or implemented by the processor of the control device. The processor may be an integrated circuit chip with signal processing capability. In the implementation process, each operation of the method for controlling the cooking apparatus can be completed by the instruction in the form of integrated logic circuit of hardware or software in the processor. The above processors can be general purpose processors, digital signal processor (DSP), other programmable logic devices, discrete gate or transistor logic device, discrete hardware component or the like. The processor may implement or perform the method, operations, and logical block diagram disclosed in the embodiments of the disclosure. The general purpose processor may be a microprocessor or the processor may be any conventional processor or the like. The operations of the method disclosed in combination with the embodiments of the disclosure can be directly embodied in the execution completion of the hardware decoding processor, or by the combination of the hardware and software modules in the decoding processor. The software module can be located in storage medium. The storage medium is located in the memory, and the processor reads the information in the memory and completes the operations of the method for controlling the cooking apparatus provided in the embodiments of the disclosure in combination with its hardware.

In an exemplary embodiment, the control device may be implemented by one or more application specific integrated circuit (ASIC), DSP, programmable logic device (PLD), complex programmable logic device (CPLD), FPGA, general purpose processor, controller, micro controller unit (MCU), microprocessor or other electronic elements, and configured to perform the above method.

Therefore, the cooking apparatus provided in the embodiments of the disclosure includes a processor and a memory configured to store computer programs executable on the processor.

The processor is configured to perform the method provided in the one or more technical solutions when executing the computer programs.

It should be noted that the respective flow of implementing method of the embodiments of the disclosure when the processor executes the computer programs will not be repeated herein for the sake of brief description.

Figure 6:
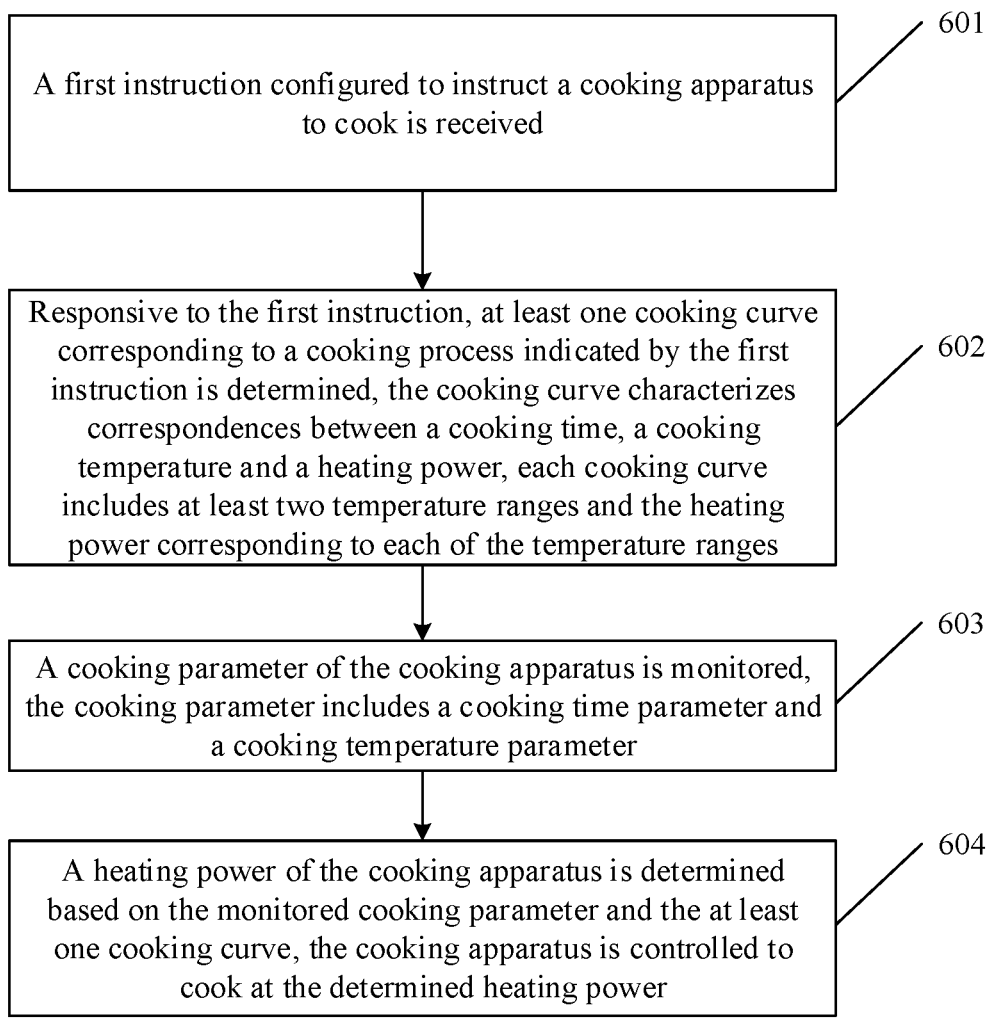
FIG. 6 is a schematic flow diagram of a cooking control method according to an embodiment of the disclosure.

In a second aspect, an embodiment of the disclosure provides a cooking control method applied to the cooking apparatus. The method includes the following operations, as shown in FIG. 6.

In operation 601, a first instruction configured to instruct a cooking apparatus to cook is received.

In the practical application, the cooking apparatus may be any cooking apparatus such as a rice cooker or an automatic cooker. The instruction received by the cooking apparatus may be an instruction in any form, for example, the instruction may be an instruction sent by a user using a terminal; the user sends voice information to the cooking apparatus, and the cooking apparatus identifies the voice information to obtain an instruction; the instruction may be an operation of an external key or a touch screen of the cooking apparatus by the user.

In the practical application, as a cooking apparatus capable of intelligent cooking, the cooking apparatus can provide the user with multiple recipes before receiving the instruction configured to instruct the cooking apparatus to cook. Each recipe may include information such as required ingredients, a preliminary processing of the ingredients (such as curing the meat or cutting and shredding the ingredients, etc.), a cooking process (such as a sauting stage, a frying stage, a stewing stage and a boiling stage, etc.), and the ingredients to be added in each cooking stage. After the user selects a recipe, the cooking apparatus provides the recipe information to the user, and the user prepares the ingredients according to the provided information and triggers an instruction to start cooking. Thus, the cooking apparatus can provide the user with multiple recipes and a cooking method of each recipe, thereby improving the user experience.

Based on this, in an embodiment, before receiving the first instruction, the method includes the following operations.

At least one recipe information is output.

A second instruction determined based on the at least one recipe information is received. The second instruction is generated after one recipe information is selected from the at least one recipe information.

Responsive to the second instruction, cooking food information matched with the recipe information corresponding to the second instruction is output.

The first instruction is triggered after preparation of a cooked food corresponding to the output cooking food information is completed, and the cooking process indicated by the first instruction is a cooking process corresponding to the recipe information corresponding to the second instruction.

In the practical application, the information output by the cooking apparatus may be information in any form, for example, information displayed on a display screen of the cooking apparatus; information sent to the user terminal; information output in the form of voice playback.

In operation 602, responsive to the first instruction, at least one cooking curve corresponding to a cooking process indicated by the first instruction is determined.

The cooking curve characterizes correspondences between a cooking time, a cooking temperature and a heating power. Each cooking curve includes at least two temperature ranges and the heating power corresponding to each of the temperature ranges.

Each cooking curve corresponds to a cooking stage (such as a sauting stage, a frying stage, a stewing stage and a boiling stage, etc.). When the cooking process indicated by the first instruction, such as cooking rice or cooking noodles, etc., only corresponds to one recipe including a cooking stage (such as a stewing stage), the cooking process indicated by the first instruction corresponds to one cooking curve. When the cooking process indicated by the first instruction corresponds to a relatively complex recipe (such as braised meat, etc.), the cooking process indicated by the first instruction corresponds to multiple cooking curves.

In operation 603, a cooking parameter of the cooking apparatus is monitored.

The cooking parameter includes a cooking time parameter and a cooking temperature parameter.

In the practical application, the cooking apparatus can monitor the cooking temperature in the cooking apparatus in real time through a temperature sensor. The cooking apparatus can monitor the cooking time through a timing module when detecting the start of cooking (e.g., detecting the start of temperature change or detecting that the cooking program has started, etc.).

In operation 604, a heating power of the cooking apparatus is determined based on the monitored cooking parameter and the at least one cooking curve. The cooking apparatus is controlled to cook at the determined heating power.

Specifically, a temperature range of the monitored cooking temperature parameter is determined based on the at least two temperature ranges contained in a currently used cooking curve. A heating power corresponding to the temperature range of the monitored cooking temperature parameter is determined based on the heating power corresponding to each of the temperature ranges contained in the currently used cooking curve. The determined heating power is used as the heating power of the cooking apparatus. The cooking apparatus is controlled to cook at the determined heating power.

In the practical application, when the cooking process indicated by the first instruction corresponds to multiple cooking curves, the cooking apparatus needs to determine an order of use of the multiple cooking curves, so that the cooking apparatus can automatically complete the cooking process of a recipe.

Based on this, in an embodiment, at least two cooking curves correspond to the cooking process indicated by the first instruction. Each of the cooking curves corresponds to a respective cooking stage. Responsive to determining the at least two cooking curves corresponding to the cooking process indicated by the first instruction, the method further includes the following operations.

An order of use of the at least two cooking curves is determined. The order of use characterizes an order of the respective cooking stage in the cooking process.

In the practical application, an order of use of a cooking curve corresponding to each recipe may be preset in the cooking apparatus. In the cooking process, the cooking apparatus acquires an order of use of a cooking curve corresponding to a recipe selected by the user, and determines a currently used cooking curve. Or when the user is familiar with the cooking process by using the cooking apparatus for many times, the user can trigger an instruction based on the cooking process information (that is, cooking stage information) included in the recipe information outputted by the cooking apparatus, so as to indicate the cooking stage that needs to be performed by the cooking apparatus at present, that is, the cooking curve corresponding to the user's instruction is taken as a currently used cooking curve. Thus, the user can select to automatically complete the cooking process of the recipe by the cooking apparatus. The user can also select the cooking stage corresponding to the current recipe to be performed in the cooking process, so as to complete the cooking process of the recipe by oneself.

Based on this, in an embodiment, when the heating power of the cooking apparatus is determined based on the monitored cooking parameter and the at least one cooking curve, the method further includes the following operations.

A currently used cooking curve is determined from the at least two cooking curves based on the determined order of use. Or a third instruction is received. A cooking curve corresponding to the third instruction is determined from the at least two cooking curves as a currently used cooking curve.

The heating power of the cooking apparatus is determined based on the monitored cooking parameter and the determined currently used cooking curve.

In the practical application, the cooking apparatus may determine a currently used cooking curve from multiple cooking curves based on the monitored cooking time parameter.

Based on this, in an embodiment, the operation that the currently used cooking curve is determined from the at least two cooking curves based on the determined order of use includes the following operations.

A cooking curve corresponding to a current cooking time parameter is determined from the at least two cooking curves based on the monitored cooking parameter and the determined order of use as the currently used cooking curve.

Specifically, each cooking curve includes at least one time range. The monitored cooking time parameter is matched with the at least one time range included in each cooking curve, so as to determine the cooking curve corresponding to the current cooking time parameter from the at least two cooking curves as the currently used cooking curve.

In the practical application, a preset condition can be set in the cooking apparatus. When the preset condition is satisfied, the cooking apparatus turns to the next cooking stage or ends the cooking process of the current recipe. Thus, the cooking apparatus can automatically complete the cooking process of the recipe selected by the user, thereby improving the user experience.

Based on this, in an embodiment, the method further includes the following operations.

When the monitored cooking parameter satisfies a preset condition, it is determined that a cooking stage corresponding to the currently used cooking curve has been completed, to control the cooking apparatus to enter a next cooking stage.

Or, the cooking apparatus is controlled to stop cooking to complete the cooking process indicated by the first instruction.

The monitored cooking parameter satisfying the preset condition includes one of the following conditions.

It is determined that the monitored cooking time parameter reaches a first time threshold contained in the currently used cooking curve.

It is determined that the monitored cooking temperature parameter exceeds a first temperature threshold contained in the currently used cooking curve.

In the practical application, the first time threshold is a maximum value on a coordinate axis characterizing the time in the current cooking curve. The first temperature threshold is a maximum value on a coordinate axis characterizing the temperature in the current cooking curve.

In the practical application, the cooking stages corresponding to a recipe except the preparation stage includes a cooking preparation stage and a cooking heating stage. In the cooking preparation stage, the user can put in the ingredients required by a current cooking stage, and at this time, the cooking apparatus can be controlled not to output heating power or to heat at a lower heating power. When the cooking apparatus is controlled to complete the current cooking stage and enter a next cooking stage, the cooking preparation stage of the next cooking stage is entered.

The disclosure will be further described in detail below in combination with the embodiment.

In an embodiment, the recipe selected by the user includes a preparation stage and four cooking stages: a sauting stage, a frying stage, a stewing stage and a boiling stage. That is, the cooking process indicated by the user corresponds to four cooking curves.

Figure 7:
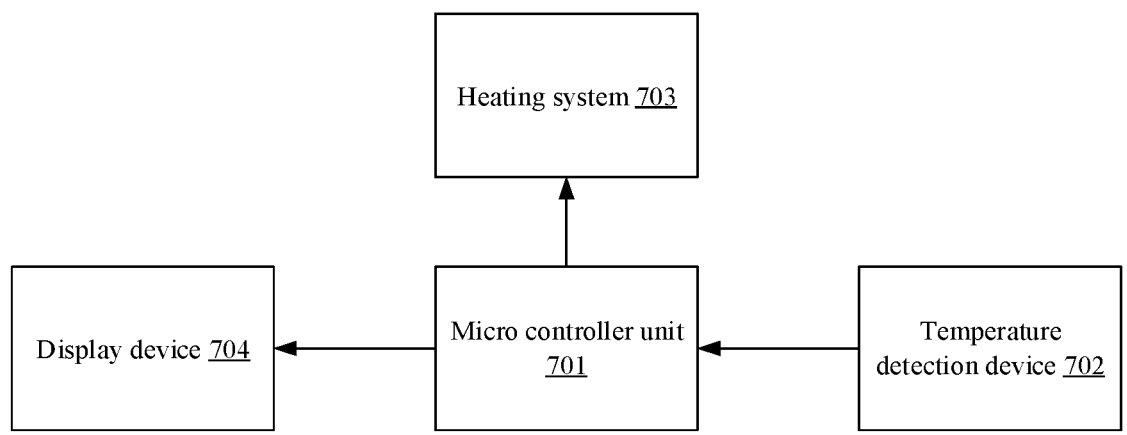
FIG. 7 is a schematic structural diagram of a cooking control device according to an embodiment of the disclosure.

The embodiment provides a cooking control device, which includes a Micro Control Unit (MCU) 701, a temperature detection device 702, a heating system 703 and a display device 704, as shown in FIG. 7.

The MCU 701 is configured to acquire a cooking temperature from the temperature detection device 702 and monitor a cooking time; determine a heating power of the cooking control device based on the cooking temperature, the monitored cooking time and a stored cooking curve; and control the heating system 703 not to heat or to heat at the determined heating power.

The temperature detection device 702 is configured to monitor the cooking temperature in real time through the temperature sensor and send the cooking temperature to the MCU 701.

The number of temperature sensors can be provided as desired. The installation position of each temperature sensor can also be provided as desired, for example, a temperature sensor can be installed at a bottom of the cooking apparatus or at a top of the cooking apparatus.

The heating system 703 is configured to heat at the heating power determined by the MCU 701.

The display device 704 is configured to display an interaction interface with the user, so that the user can select a recipe and the user can be prompted to add the respective ingredients.

In the embodiment, the display device 704 is a Thin Film Transistor (TFT) type display screen. In the practical application, the display device 704 may be any type of display screen.

Figure 8:
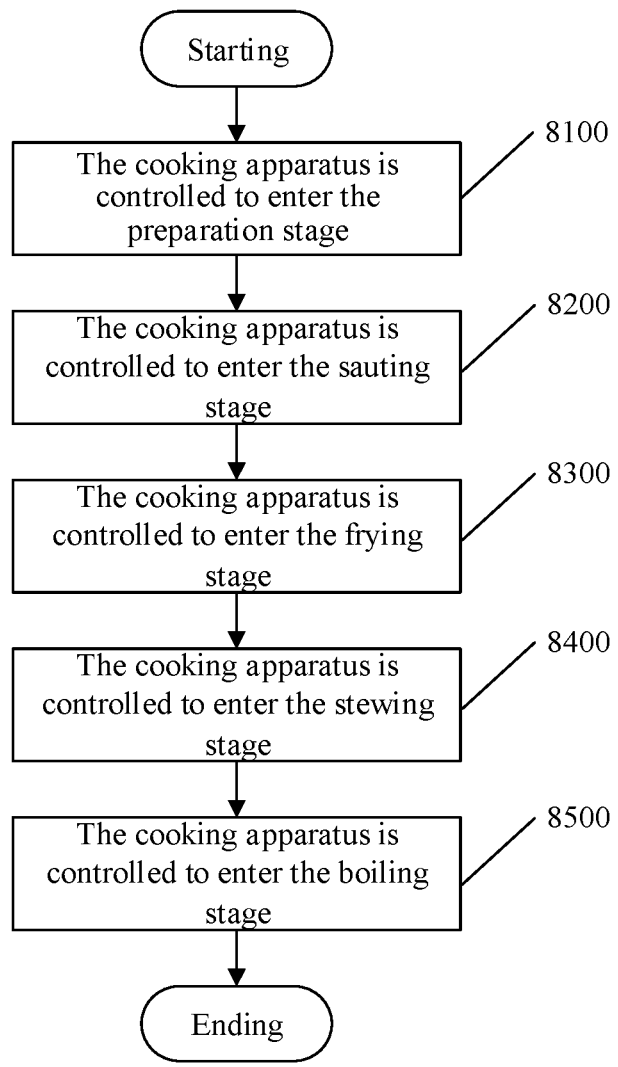
FIG. 8 is a schematic flow diagram of a cooking control method according to an embodiment of the disclosure.

Based on the above cooking control device, as shown in FIG. 8, the cooking control method provided in the embodiment includes the following operations.

In operation 8100, the cooking apparatus is controlled to enter the preparation stage. Thereafter, operation 8200 is performed.

Figure 9:
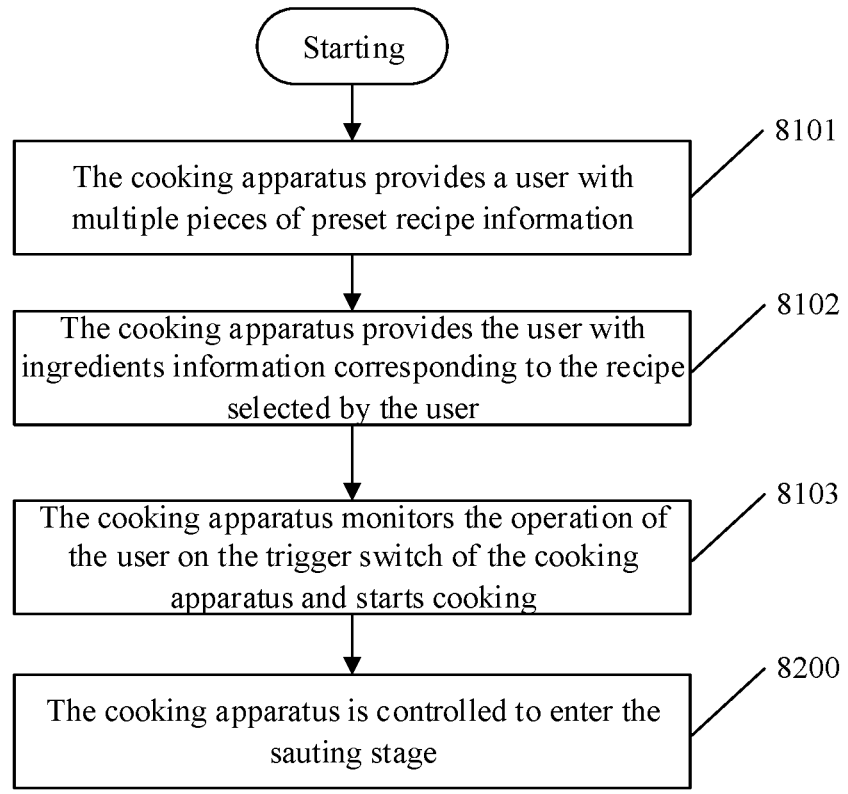
FIG. 9 is a schematic flow diagram of a preparation stage in a cooking control method according to an embodiment of the disclosure.

Specifically, as shown in FIG. 9, the preparation stage in the cooking control method provided in the present embodiment includes the following operations.

In operation 8101, the cooking apparatus provides a user with multiple pieces of preset recipe information. Thereafter, operation 8102 is performed.

Here, the MCU 701 provides the user with multiple pieces of preset recipe information through the display device 704 (that is, a TFT-type display screen) for the user to select.

In operation 8102, the cooking apparatus provides the user with ingredients information corresponding to the recipe selected by the user. Thereafter, operation 8103 is performed.

Here, the MCU 701 acquires ingredients information corresponding to the recipe information selected by the user from the locally stored information based on the recipe information selected by the user, and displays the ingredients information to the user through the display device 704.

Specifically, after the cooking apparatus receives the user's instruction (which may be a recipe selected by the user from the recipes provided by the cooking apparatus through a touch screen or a key, or the like), the cooking apparatus provides the user with ingredients information corresponding to the recipe selected by the user, so that the user can prepare related ingredients according to the ingredients information prompted by the cooking apparatus.

In operation 8103, the cooking apparatus detects the operation of the user on the trigger switch of the cooking apparatus and starts cooking. Thereafter, operation 8200 is performed.

Here, the trigger switch may be a key switch or other trigger devices such as a touch screen switch.

In the above preparation stage, the MCU 701 does not control the heating of the heating system 703, so that there is no time limit in this preparation stage. In each subsequent cooking stage, the MCU 701 monitors the cooking temperature through the temperature detection device 702, determines the heating power based on the monitored cooking time and the preset cooking curve corresponding to the current cooking stage, and controls the heating system 703 to cook at the determined heating power.

In operation 8200, the cooking apparatus is controlled to enter the sauting stage. Thereafter, operation 8300 is performed.

Figure 10:
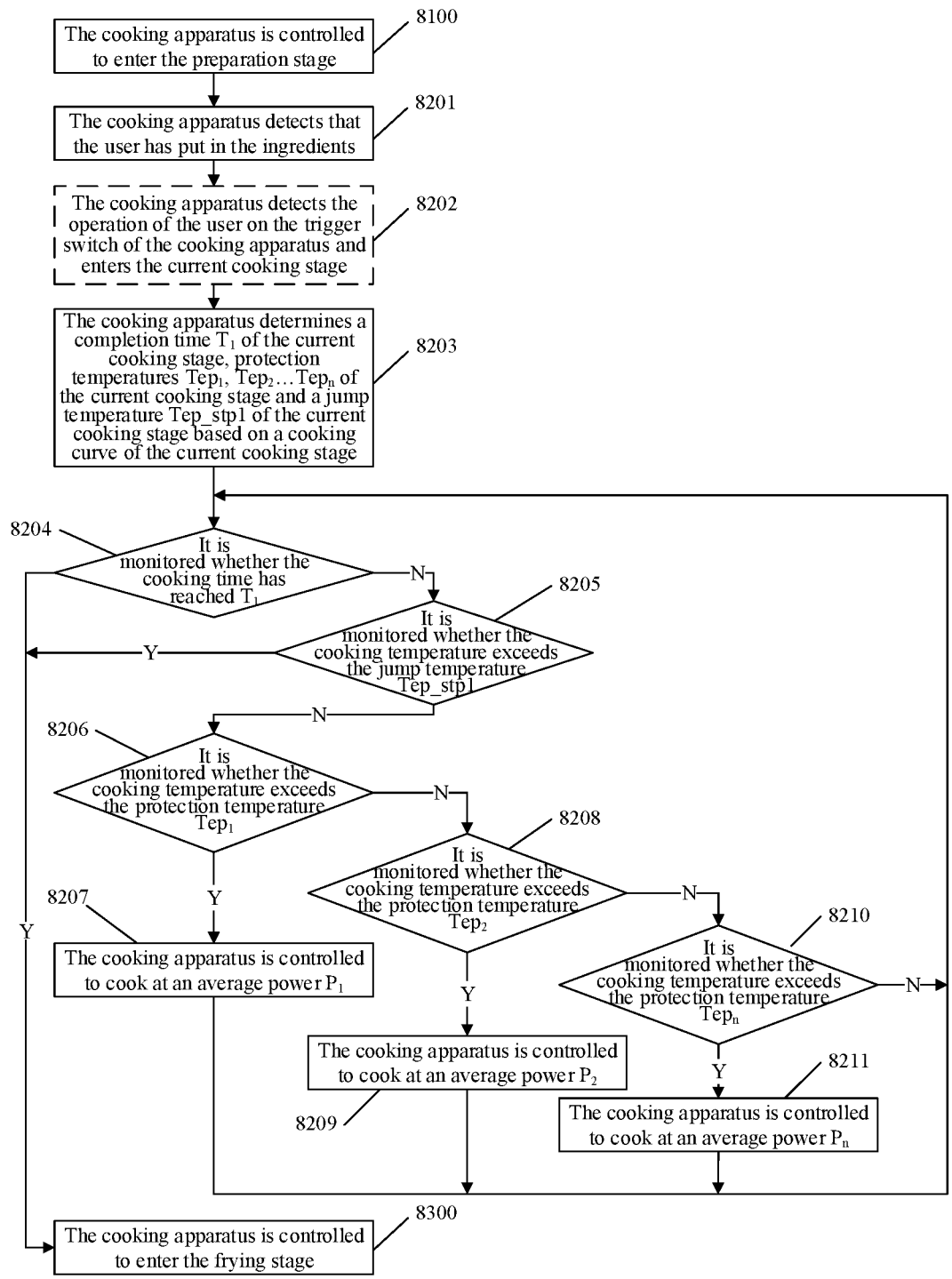
FIG. 10 is a schematic flow diagram of a sauting stage in a cooking control method according to an embodiment of the disclosure.

Specifically, as shown in FIG. 10, the sauting stage in the cooking control method provided in the embodiment includes the following operations.

In operation 8201, the cooking apparatus detects that the user has put in the ingredients. Thereafter, operation 8202 or operation 8203 is performed.

Specifically, the cooking apparatus may detect, by means of an installed weight sensor or the like, that the user has put in the ingredients required for the current cooking stage of preparation based on the ingredients information prompted by the cooking apparatus.

In operation 8202, the cooking apparatus detects the operation of the user on the trigger switch of the cooking apparatus and enters the current cooking stage. Thereafter, operation 8203 is performed.

In the practical application, operation 8202 may also be omitted. The cooking apparatus directly enters the current cooking stage after detecting that the user has put in the ingredients.

In operation 8203, the cooking apparatus determines a completion time $T_1$ of the current cooking stage, protection temperatures $Tep_1$, $Tep_2$ . . . . $Tep_n$ of the current cooking stage and a jump temperature $Tep\_stp1$ of the current cooking stage based on a cooking curve of the current cooking stage. Thereafter, operation 8204 is performed.

Here, the completion time $T_1$ is a first time threshold of the sauting stage, the jump temperature $Tep\_stp1$ is a first temperature threshold of the sauting stage. $Tep\_stp1$ is greater than all protection temperatures of the current cooking stage, that is, $Tep\_stp1$ is greater than $Tep_1$, $Tep_2$ . . . $Tep_n$.

In the practical application, $T_1$ can be less than or equal to 3 minutes. In the practical application, the range of $T_1$ can be set according to cooking requirements. The number of protection temperatures n can also be set according to cooking requirements. The more the number of protection temperatures, the more accurate the control of the cooking apparatus and the better the user experience.

In operation 8204, it is monitored whether the cooking time has reached $T_1$. In a case that the cooking time has not reached $T_1$, operation 8205 is performed, and in a case that the cooking time has reached $T_1$, operation 8300 is performed.

In operation 8205, it is monitored whether the cooking temperature exceeds the jump temperature $Tep\_stp1$. In a case that the cooking temperature does not exceed the jump temperature $Tep\_stp1$, operation 8206 is performed, and in a case that the cooking temperature exceeds the jump temperature $Tep\_stp1$, operation 8300 is performed.

In operation 8206, it is monitored whether the cooking temperature exceeds the protection temperature $Tep_1$. In a case that the cooking temperature exceeds the protection temperature $Tep_1$, operation 8207 is performed, and in a case that the cooking temperature does not exceed the protection temperature $Tep_1$, operation 8208 is performed.

In operation 8207, the cooking apparatus is controlled to cook at an average power $P_1$. Thereafter, operation 8204 is performed.

Here, the average power $P_1$ is a heating power corresponding to a temperature range $Tep_1 \sim Tep\_stp1$ in a cooking curve corresponding to the sauting stage.

In operation 8208, it is monitored whether the cooking temperature exceeds the protection temperature $Tep_2$. In a case that the cooking temperature exceeds the protection temperature $Tep_2$, operation 8209 is performed, and in a case that the cooking temperature does not exceed the protection temperature $Tep_2$, operation 8210 is performed.

In operation 8209, the cooking apparatus is controlled to cook at an average power $P_2$. Thereafter, operation 8204 is performed.

Here, the average power $P_2$ is a heating power corresponding to a temperature range $Tep_2 \sim Tep_1$ in the cooking curve corresponding to the sauting stage.

In operation 8210, it is monitored whether the cooking temperature exceeds the protection temperature $Tep_n$. In a case that the cooking temperature exceeds the protection temperature $Tep_n$, operation 8211 is performed, and in a case that the cooking temperature does not exceed the protection temperature $Tep_n$, operation 8204 is performed.

In operation 8211, the cooking apparatus is controlled to cook at an average power $P_n$. Thereafter, operation 8204 is performed.

Here, the average power $P_n$ is a heating power corresponding to a temperature range $Tep_n$~$Tep_2$ in the cooking curve corresponding to the sauting stage.

In the practical application, the higher the cooking temperature in the cooking apparatus, the lower the heating power, that is, $P_n$ is greater than . . . $P_2$, $P_1$. Thus, the safety of the cooking apparatus can be improved, the mouthfeel of the cooked food can be improved, and the user experience can be improved.

In operation 8300, the cooking apparatus is controlled to enter the frying stage. Thereafter, operation 8400 is performed.

Figure 11:
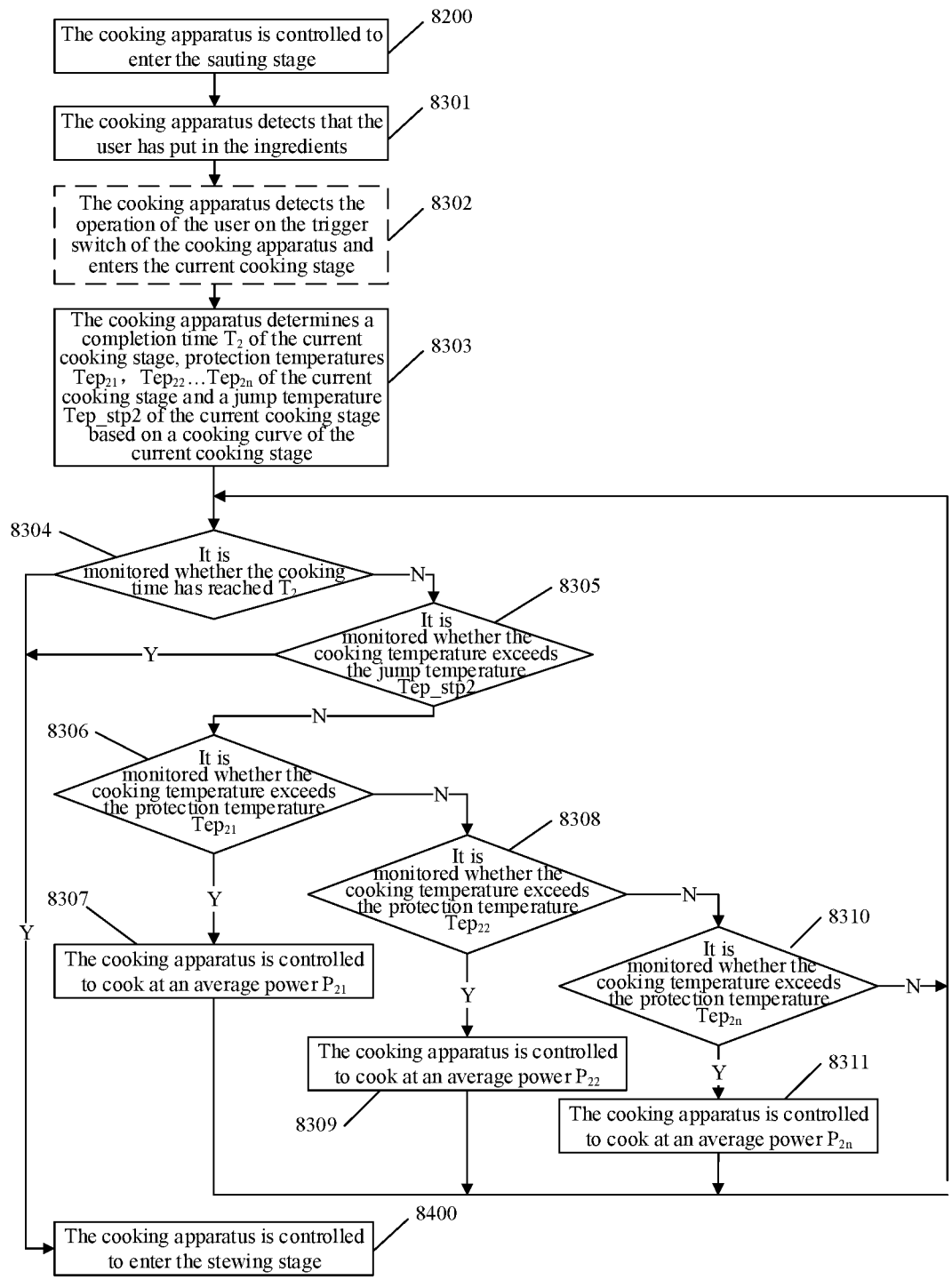
FIG. 11 is a schematic flow diagram of a frying stage in a cooking control method according to an embodiment of the disclosure.

Specifically, as shown in FIG. 11, the frying stage in the cooking control method provided in the embodiment includes the following operations.

In operation 8301, the cooking apparatus detects that the user has put in the ingredients. Thereafter, operation 8302 or operation 8303 is performed.

Specifically, the cooking apparatus may detect, by means of an installed weight sensor or the like, that the user has put in the ingredients required for the current cooking stage of preparation based on the ingredients information prompted by the cooking apparatus.

In operation 8302, the cooking apparatus detects the operation of the user on the trigger switch of the cooking apparatus and enters the current cooking stage. Thereafter, operation 8303 is performed.

In the practical application, operation 8302 may also be omitted. The cooking apparatus directly enters the current cooking stage after detecting that the user has put in the ingredients.

In operation 8303, the cooking apparatus determines a completion time $T_2$ of the current cooking stage, protection temperatures $Tep_{21}$, $Tep_{22}$ . . . $Tep_{2n}$ of the current cooking stage and a jump temperature $Tep\_stp2$ of the current cooking stage based on a cooking curve of the current cooking stage. Thereafter, operation 8304 is performed.

Here, the completion time $T_2$ is a first time threshold of the frying stage, the jump temperature $Tep\_stp2$ is a first temperature threshold of the frying stage. $Tep\_stp2$ is greater than all protection temperatures of the current cooking stage, that is, $Tep\_stp2$ is greater than $Tep_{21}$, $Tep_{22}$ . . . $Tep_{2n}$.

In the practical application, $T_2$ can be less than or equal to 5 minutes. In the practical application, the range of $T_2$ can be set according to cooking requirements. The number of protection temperatures can also be set according to cooking requirements. The more the number of protection temperatures, the more accurate the control of the cooking apparatus and the better the user experience.

In operation 8304, it is monitored whether the cooking time has reached $T_2$. In a case that the cooking time has not reached $T_2$, operation 8305 is performed, and in a case that the cooking time has reached $T_2$, operation 8400 is performed.

In operation 8305, it is monitored whether the cooking temperature exceeds the jump temperature $Tep\_stp2$. In a case that the cooking temperature does not exceed the jump temperature $Tep\_stp2$, operation 8306 is performed, and in a case that the cooking temperature exceeds the jump temperature $Tep\_stp2$, operation 3400 is performed.

In operation 8306, it is monitored whether the cooking temperature exceeds the protection temperature $Tep_{21}$. In a case that the cooking temperature exceeds the protection temperature $Tep_{21}$, operation 8307 is performed, and in a case that the cooking temperature does not exceed the protection temperature $Tep_{21}$, operation 8308 is performed.

In operation 8307, the cooking apparatus is controlled to cook at an average power $P_{21}$. Thereafter, operation 8304 is performed.

Here, the average power $P_{21}$ is a heating power corresponding to a temperature range $Tep_{21}$~$Tep\_stp2$ in the cooking curve corresponding to the frying stage.

In operation 8308, it is monitored whether the cooking temperature exceeds the protection temperature $Tep_{22}$. In a case that the cooking temperature exceeds the protection temperature $Tep_{22}$, operation 8309 is performed, and in a case that the cooking temperature does not exceed the protection temperature $Tep_{22}$, operation 8310 is performed.

In operation 8309, the cooking apparatus is controlled to cook at an average power $P_{22}$. Thereafter, operation 8304 is performed.

Here, the average power $P_{22}$ is a heating power corresponding to a temperature range $Tep_{22}$~$Tep_{21}$ in the cooking curve corresponding to the frying stage.

In operation 8310, it is monitored whether the cooking temperature exceeds the protection temperature $Tep_{2n}$. In a case that the cooking temperature exceeds the protection temperature $Tep_{2n}$, operation 8311 is performed, and in a case that the cooking temperature does not exceed the protection temperature $Tep_{2n}$, operation 8304 is performed.

In operation 8311, the cooking apparatus is controlled to cook at an average power $P_{2n}$. Thereafter, operation 8304 is performed.

Here, the average power $P_{2n}$ is a heating power corresponding to a temperature range $Tep_{2n}$~$Tep_{22}$ in the cooking curve corresponding to the frying stage.

In the practical application, the higher the cooking temperature in the cooking apparatus, the lower the heating power, that is, $P_{2n}$ is greater than . . . $P_{22}$, $P_{21}$. Thus, the safety of the cooking apparatus can be improved, the mouthfeel of the cooked food can be improved, and the user experience can be improved.

In operation 8400, the cooking apparatus is controlled to enter the stewing stage. Thereafter, operation 8500 is performed.

Figure 12:
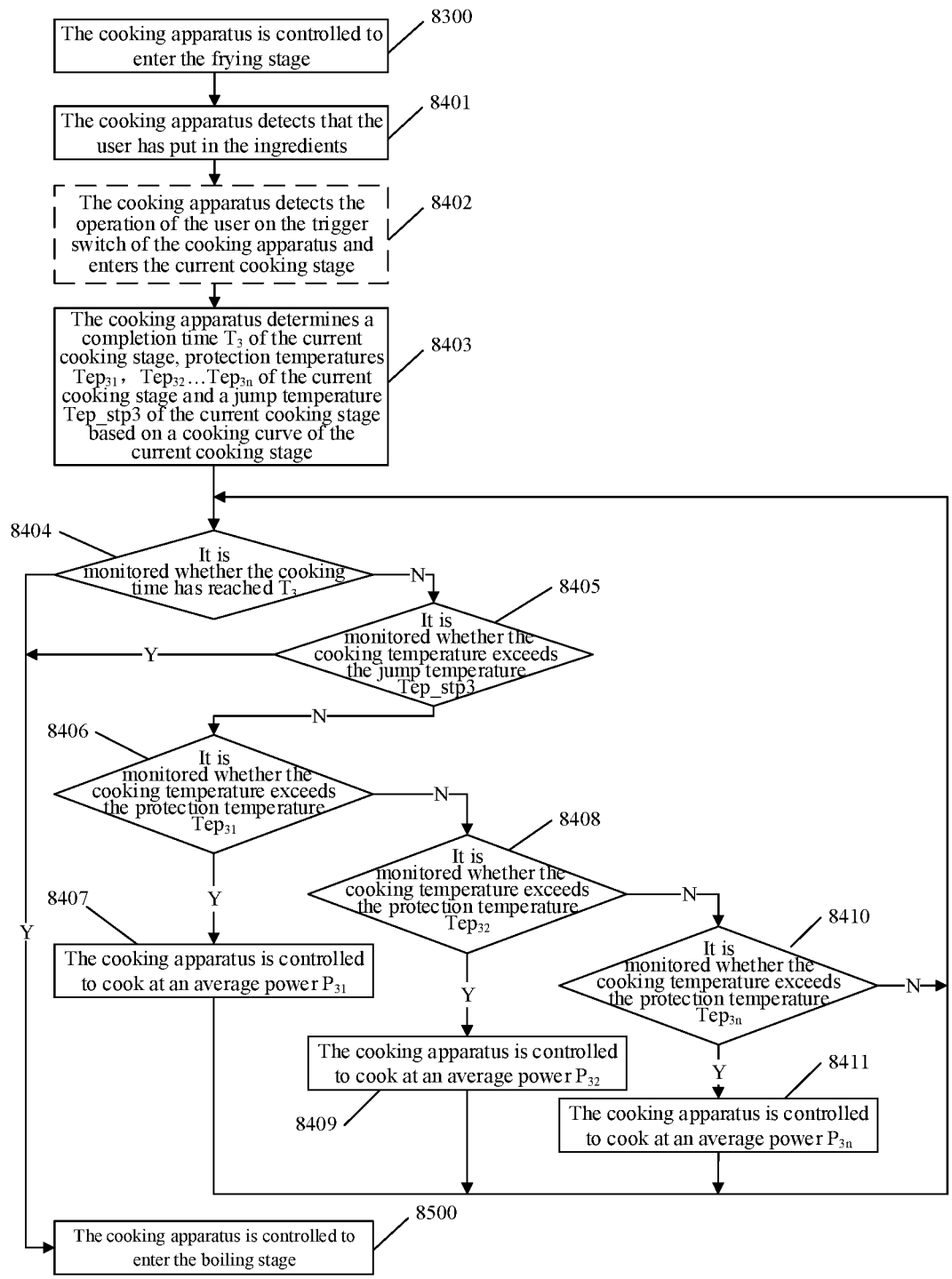
FIG. 12 is a schematic flow diagram of a stewing stage in a cooking control method according to an embodiment of the disclosure.

Specifically, as shown in FIG. 12, the stewing stage in the cooking control method provided in the embodiment includes the following operations.

In operation 8401, the cooking apparatus detects that the user has put in the ingredients. Thereafter, operation 8402 or operation 8403 is performed.

Specifically, the cooking apparatus may detect, by means of an installed weight sensor or the like, that the user has put in the ingredients required for the current cooking stage of preparation based on the ingredients information prompted by the cooking apparatus.

In operation 8402, the cooking apparatus detects the operation of the user on the trigger switch of the cooking apparatus and enters the current cooking stage. Thereafter, operation 8403 is performed.

In the practical application, operation 8402 may also be omitted. The cooking apparatus directly enters the current cooking stage after detecting that the user has put in the ingredients.

In operation 8403, the cooking apparatus determines a completion time $T_3$ of the current cooking stage, protection temperatures $Tep_{31}$, $Tep_{32}$ ... $Tep_{3n}$ of the current cooking stage and a jump temperature Tep_stp3 of the current cooking stage based on a cooking curve of the current cooking stage. Thereafter, operation 8404 is performed.

Here, the completion time T3 is a first time threshold of the stewing stage, the jump temperature Tep_stp3 is a first temperature threshold of the stewing stage. Tep_stp3 is greater than all protection temperatures of the current cooking stage, that is, Tep_stp3 is greater than $Tep_{31}$, $Tep_{32}$ .... $Tep_{3n}$.

In the practical application, the range of $T_3$ can be 1 minute to 10 hours. In the practical application, the range of $T_3$ can be set according to cooking requirements. The number of protection temperatures can also be set according to cooking requirements. The more the number of protection temperatures, the more accurate the control of the cooking apparatus and the better the user experience.

In operation 8404, it is monitored whether the cooking time has reached $T_3$. In a case that the cooking time has not reached $T_3$, operation 8405 is performed, and in a case that the cooking time has reached $T_3$, operation 8500 is performed.

In operation 8405, it is monitored whether the cooking temperature exceeds the jump temperature Tep_stp3. In a case that the cooking temperature does not exceed the jump temperature Tep_stp3, operation 8406 is performed, and in a case that the cooking temperature exceeds the jump temperature Tep_stp3, operation 8500 is performed.

In operation 8406, it is monitored whether the cooking temperature exceeds the protection temperature $Tep_{31}$. In a case that the cooking temperature exceeds the protection temperature $Tep_{31}$, operation 8407 is performed, and in a case that the cooking temperature does not exceed the protection temperature $Tep_{31}$, operation 8408 is performed.

In operation 8407, the cooking apparatus is controlled to cook at an average power $P_{31}$. Thereafter, operation 8404 is performed.

Here, the average power $P_{31}$ is a heating power corresponding to a temperature range $Tep_{31}$~Tep_stp3 in the cooking curve corresponding to the stewing stage.

In operation 8408, it is monitored whether the cooking temperature exceeds the protection temperature $Tep_{32}$. In a case that the cooking temperature exceeds the protection temperature $Tep_{32}$, operation 8409 is performed, and in a case that the cooking temperature does not exceed the protection temperature $Tep_{32}$, operation 8410 is performed.

In operation 8409: the cooking apparatus is controlled to cook at an average power $P_{32}$. Thereafter, operation 8404 is performed.

Here, the average power $P_{32}$ is a heating power corresponding to a temperature range $Tep_{32}$~$Tep_{31}$ in the cooking curve corresponding to the stewing stage.

In operation 8410, it is monitored whether the cooking temperature exceeds the protection temperature $Tep_{3n}$. In a case that the cooking temperature exceeds the protection temperature $Tep_{3n}$, operation 8411 is performed, and in a case that the cooking temperature does not exceed the protection temperature $Tep_{3n}$, operation 8404 is performed.

In operation 8411, the cooking apparatus is controlled to cook at an average power $P_{3n}$. Thereafter, operation 8404 is performed.

Here, the average power $P_{3n}$ is a heating power corresponding to a temperature range $Tep_{3n}$~$Tep_{32}$ in the cooking curve corresponding to the stewing stage.

In the practical application, the higher the cooking temperature in the cooking apparatus, the lower the heating power, that is, $P_{3n}$ is greater than ... $P_{32}$, $P_{31}$. Thus, the safety of the cooking apparatus can be improved, the mouthfeel of the cooked food can be improved, and the user experience can be improved.

In operation 8500, the cooking apparatus is controlled to enter the boiling stage.

Figure 13:
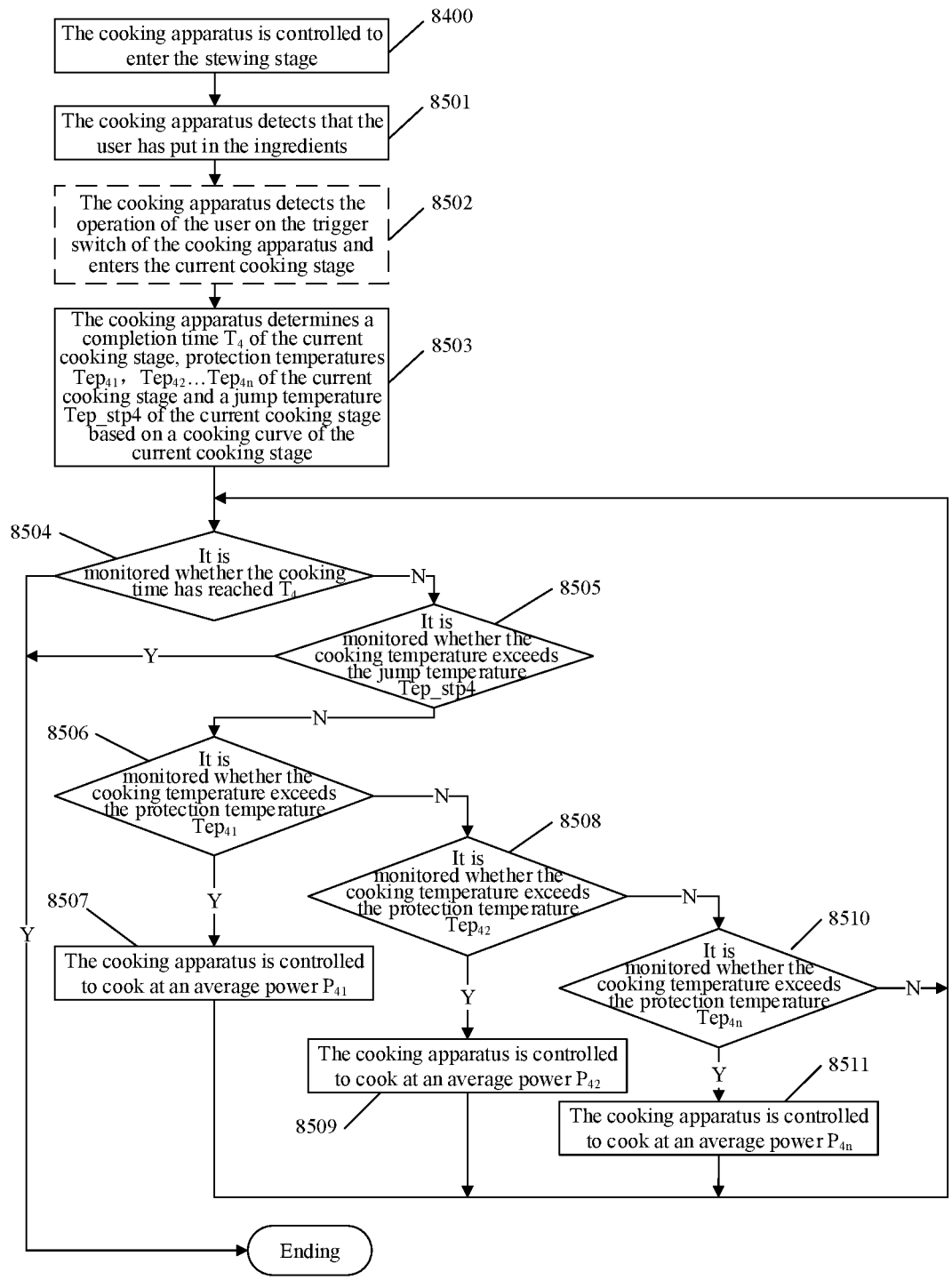
FIG. 13 is a schematic flow diagram of a boiling stage in a cooking control method according to an embodiment of the disclosure.

Specifically, as shown in FIG. 13, the boiling stage in the cooking control method provided in the embodiment includes the following operations.

In operation 8501, the cooking apparatus detects that the user has put in the ingredients. Thereafter, operation 8502 or operation 8503 is performed.

Specifically, the cooking apparatus may detect, by means of an installed weight sensor or the like, that the user has put in the ingredients required for the current cooking stage of preparation based on the ingredients information prompted by the cooking apparatus.

In operation 8502, the cooking apparatus detects the operation of the user on the trigger switch of the cooking apparatus and enters the current cooking stage. Thereafter, operation 8503 is performed.

In the practical application, operation 8502 may also be omitted. The cooking apparatus directly enters the current cooking stage after detecting that the user has put in the ingredients.

In operation 8503, the cooking apparatus determines a completion time $T_4$ of the current cooking stage, protection temperatures $Tep_{41}$, $Tep_{42}$ ... $Tep_{4n}$ of the current cooking stage and a jump temperature Tep_stp4 of the current cooking stage based on a cooking curve of the current cooking stage. Thereafter, operation 8504 is performed.

Here, the completion time $T_4$ is a first time threshold of the boiling stage, the jump temperature Tep_stp4 is a first temperature threshold of the boiling stage. Tep_stp4 is greater than all protection temperatures of the current cooking stage, that is, Tep_stp4 is greater than $Tep_{41}$, $Tep_{42}$ .... $Tep_{4n}$.

In the practical application, $T_4$ can be less than or equal to 10 minutes. In the practical application, the range of $T_4$ can be set according to cooking requirements. The number of protection temperatures can also be set according to cooking requirements. The more the number of protection temperatures, the more accurate the control of the cooking apparatus and the better the user experience.

In operation 8504, it is monitored whether the cooking time has reached $T_4$. In a case that the cooking time has not reached $T_4$, operation 8505 is performed, and in a case that the cooking time has reached $T_4$, it is determined that cooking for the current recipe has been completed.

In operation 8505, it is monitored whether the cooking temperature exceeds the jump temperature Tep_stp4. In a case that the cooking temperature does not exceed the jump temperature Tep_stp4, operation 8506 is performed, and in a case that the cooking temperature exceeds the jump temperature Tep_stp4, it is determined that cooking for the current recipe has been completed.

In operation 8506, it is monitored whether the cooking temperature exceeds the protection temperature $Tep_{41}$. In a case that the cooking temperature exceeds the protection temperature $Tep_{41}$, operation 8507 is performed, and in a case that the cooking temperature does not exceed the protection temperature $Tep_{41}$, operation 8508 is performed.

In operation 8507, the cooking apparatus is controlled to cook at an average power $P_{41}$. Thereafter, operation 8504 is performed.

Here, the average power $P_{41}$ is a heating power corresponding to a temperature range $Tep_{41}$~$Tep\_stp4$ in the cooking curve corresponding to the boiling stage.

In operation 8508, it is monitored whether the cooking temperature exceeds the protection temperature $Tep_{42}$. In a case that the cooking temperature exceeds the protection temperature $Tep_{42}$, operation 8509 is performed, and in a case that the cooking temperature does not exceed the protection temperature $Tep_{42}$, operation 8510 is performed.

In operation 8509, the cooking apparatus is controlled to cook at an average power $P_{42}$. Thereafter, operation 8504 is performed.

Here, the average power $P_{42}$ is a heating power corresponding to a temperature range $Tep_{42}$~$Tep_{41}$ in the cooking curve corresponding to the boiling stage.

In operation 8510, it is monitored whether the cooking temperature exceeds the protection temperature $Tep_{4n}$. In a case that the cooking temperature exceeds the protection temperature $Tep_{4n}$, operation 8511 is performed, and in a case that the cooking temperature does not exceed the protection temperature $Tep_{4n}$, operation 8504 is performed.

In operation 8511, the cooking apparatus is controlled to cook at an average power $P_{4n}$. Thereafter, operation 8504 is performed.

Here, the average power $P_{4n}$ is a heating power corresponding to a temperature range $Tep_{4n}$~$Tep_{42}$ in the cooking curve corresponding to the boiling stage.

In the practical application, the higher the cooking temperature in the cooking apparatus, the lower the heating power, that is, $P_{4n}$ is greater than . . . $P_{42}$, $P_{41}$. Thus, the safety of the cooking apparatus can be improved, the mouthfeel of the cooked food can be improved, and the user experience can be improved.

Figure 14:
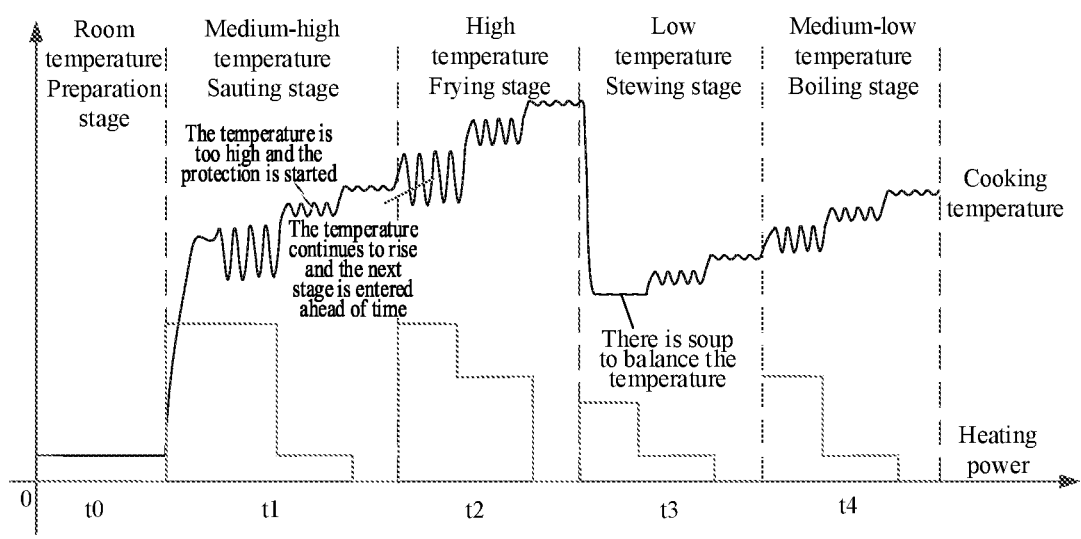
FIG. 14 is a schematic diagram illustrating changes of temperature and power as a function of time in a cooking process according to an embodiment of the disclosure.

FIG. 14 is a schematic diagram illustrating changes of temperature and power as a function of time in the entire cooking process according to an embodiment of the disclosure. As shown in FIG. 14, in the preparation stage to, since the cooking apparatus does not output the heating power, the cooking temperature in the preparation stage is room temperature, and the cooking temperature does not change. In the sauting stage $t_1$, the frying stage $t_2$, the stewing stage $t_3$, and the boiling stage $t_4$, the cooking apparatus is controlled to cook at a higher heating power, and then the heating power is reduced with the change of cooking temperature. When the cooking time reaches the cooking completion time (i.e., the first time threshold) or when the cooking temperature exceeds the jump temperature (i.e., the first temperature threshold), the cooking apparatus is controlled to enter the next cooking stage. Or, it is determined that the cooking process for the current recipe has been completed, and the cooking apparatus is controlled to end cooking.

The solution provided in the embodiment has the following advantages.

The solution provides the user with multiple recipes and the cooking method of each recipe, and accurately controls the heating power of the cooking apparatus, so as to improve the mouthfeel of the cooked food, and improve the user experience.

Figure 15:
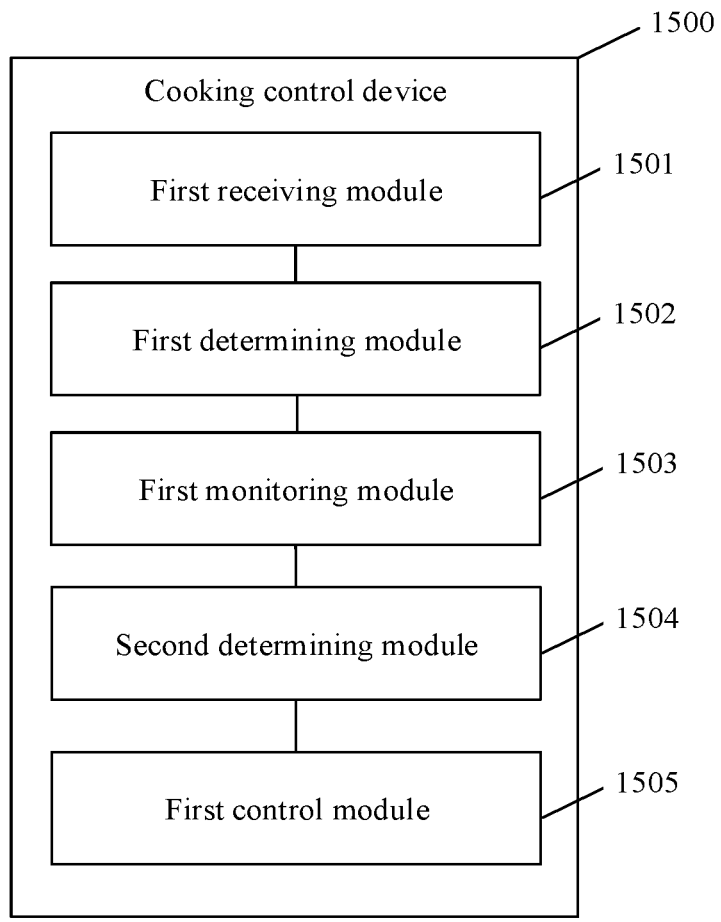
FIG. 15 is a schematic structural diagram of a cooking control device according to an embodiment of the disclosure.

In order to implement the method of the embodiments of the disclosure, an embodiment of the disclosure further provides a cooking control device. As shown in FIG. 15, the cooking control device 1500 includes a first receiving module 1501, a first determining module 1502, a first monitoring module 1503, a second determining module 1504 and a first control module 1505.

The first receiving module 1501 is configured to receive a first instruction. The first instruction is configured to instruct a cooking apparatus to cook.

The first determining module 1502 is configured to determine at least one cooking curve corresponding to a cooking process indicated by the first instruction responsive to the first instruction. The cooking curve characterizes correspondences between a cooking time, a cooking temperature and a heating power. Each cooking curve includes at least two temperature ranges and the heating power corresponding to each of the temperature ranges.

The first monitoring module 1503 is configured to monitor a cooking parameter of the cooking apparatus. The cooking parameter includes a cooking time parameter and a cooking temperature parameter.

The second determining module 1504 is configured to determine a heating power of the cooking apparatus based on the monitored cooking parameter and the at least one cooking curve.

The first control module 1505 is configured to control the cooking apparatus to cook at a determined heating power.

In an embodiment, the cooking control device 1500 may further include a first output module, a second receiving module and a second output module.

The first output module is configured to output at least one recipe information.

The second receiving module is configured to receive a second instruction determined based on the at least one recipe information, and the second instruction is generated after one recipe information is selected from the at least one recipe information.

The second output module is configured to output cooking food information matched with the recipe information corresponding to the second instruction.

The first instruction is triggered after preparation of a cooked food corresponding to the output cooking food information is completed, and the cooking process indicated by the first instruction is a cooking process corresponding to the recipe information corresponding to the second instruction.

In an embodiment, the cooking control device 1500 may further include a third determining module. The third determining module is configured to determine an order of use of the at least two cooking curves. The order of use characterizes an order of use of the respective cooking stage in the cooking process.

The second determining module 1504 is further configured to perform the following operations.

A currently used cooking curve is determined from the at least two cooking curves based on the determined order of use. Or a third instruction is received. A cooking curve corresponding to the third instruction is determined from the at least two cooking curves as a currently used cooking curve.

The heating power of the cooking apparatus is determined based on the monitored cooking parameter and the determined currently used cooking curve.

In an embodiment, the second determining module 1504 is configured to perform the following operations.

A cooking curve corresponding to a current cooking time parameter is determined from the at least two cooking curves based on the monitored cooking parameter and the determined order of use as the currently used cooking curve.

In an embodiment, the cooking control device 1500 may further include a second control module. The second control module is configured to perform the following operations.

When the monitored cooking parameter satisfies a preset condition, it is determined that a cooking stage corresponding to the currently used cooking curve has been completed, to control the cooking apparatus to enter a next cooking stage.

Or, the cooking apparatus is controlled to stop cooking to complete the cooking process indicated by the first instruction.

In an embodiment, the monitored cooking parameter satisfying the preset condition includes one of the following conditions.

It is determined that the monitored cooking time parameter reaches a first time threshold contained in the currently used cooking curve.

It is determined that the monitored cooking temperature parameter exceeds a first temperature threshold contained in the currently used cooking curve.

In an embodiment, the second determining module 1504 is configured to perform the following operations.

A temperature range of the monitored cooking temperature parameter is determined based on the at least two temperature ranges contained in a currently used cooking curve.

A heating power corresponding to the temperature range of the monitored cooking temperature parameter is determined based on the heating power corresponding to each of the temperature ranges contained in the currently used cooking curve.

The determined heating power is used as the heating power of the cooking apparatus.

The functions of the first receiving module 1501, the first determining module 1502, the first monitoring module 1503, the second determining module 1504, the first control module 1505, the second receiving module, the third determining module and the second control module correspond to the functions of the MCU 701, the temperature detection device 702 and the heating system 703 in the above embodiment. The functions of the first output module and the second output module correspond to the functions of the display device 704 in the above embodiment.

In the practical application, the first receiving module 1501, the first determining module 1502, the first monitoring module 1503, the second determining module 1504, the first control module 1505, the second receiving module, the third determining module, the second control module, the first output module and the second output module may be implemented by a processor in the cooking control device 1500 in combination with a communication interface.

It should be noted that when the cooking control device 1500 provided in the above embodiment controls the cooking apparatus, only the division of each program module is given as an example. In the practical application, the processing assignment may be performed by different program modules as desired, that is, the internal structure of the device is divided into different program modules to perform all or part of the processing described above. In addition, the cooking control device 1500 provided in the above embodiment belongs to the same concept as the method embodiment, the detailed implementation of which can be found in the method embodiment and will not be repeated herein.

Figure 16:
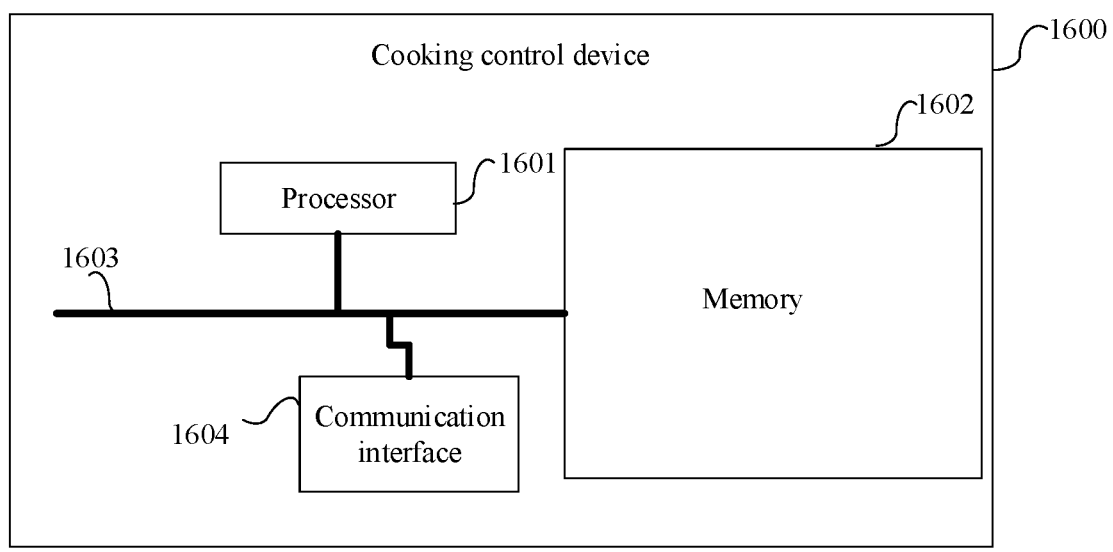
FIG. 16 is a schematic diagram of a hardware structure of a cooking control device according to an embodiment of the disclosure.

An embodiment of the disclosure further provides a cooking control device based on the hardware implementation of the program module and in order to implement the method of the embodiments of the disclosure. As shown in FIG. 16, the cooking control device 1600 includes a processor 1601 and a memory 1602.

The processor 1601 is connected with a communication interface 1604 to implement information interaction with the user or the user terminal, and is configured to perform the cooking control method provided in the one or more technical solutions when executing the computer programs.

The memory 1602 is configured to store computer programs executable on the processor 1601.

That is, the respective flow of methods of the embodiments of the disclosure is implemented when the processor 1601 executes the computer programs, which will not be repeated herein for the sake of brief description.

Of course, in the practical application, the various components of the cooking control device 1600 are coupled together by a bus system 1603. It can be understood that the bus system 1603 is configured to implement connection communication between these components. The bus system 1603 includes a power bus, a control signal bus and a status signal bus in addition to a data bus. However, for clarity of illustration, the various buses are designated as bus system 1603 in FIG. 16.

The memory 1602 in the embodiments of the disclosure is configured to store various types of data to support the operation of the cooking control device 1600. Examples of such data include any computer programs operable on the cooking control device 1600.

The method disclosed in the above embodiment of the disclosure may be applied to or implemented by the processor 1601. The processor 1601 may be an integrated circuit chip with signal processing capability. In the implementation process, each operation of the above method can be completed by the instruction in the form of integrated logic circuit of hardware or software in the processor 1601. The above processors 1601 can be general purpose processors, digital signal processor (DSP), other programmable logic devices, discrete gate or transistor logic device, discrete hardware component or the like. The processor 1601 may implement or perform the method, operations, and logical block diagram disclosed in the embodiments of the disclosure. The general purpose processor may be a microprocessor or the processor may be any conventional processor or the like. The operations of the method disclosed in combination with the embodiments of the disclosure can be directly embodied in the execution completion of the hardware decoding processor, or by the combination of the hardware and software modules in the decoding processor. The software module can be located in storage medium. The storage medium is located in the memory 1602, and the processor 1601 reads the information in the memory 1602 and completes the operations of the above method in combination with its hardware.

In an exemplary embodiment, the cooking control device 1600 may be implemented by one or more ASIC, DSP, PLD, CPLD, FPGA, general purpose processor, controller, MCU, microprocessor or other electronic elements, and configured to perform the above method.

It can be understood that the memory in the embodiments of the disclosure may be volatile memory or non-volatile memory, or may include both volatile and non-volatile memory. The non-volatile memory can be Read-Only Memory (ROM), Programmable Read-Only Memory (PROM), Erasable Programmable Read-Only Memory (EPROM), Electrically Erasable Programmable Read-Only Memory (EEPROM), ferromagnetic random access memory (FRAM), Flash Memory, magnetic surface memory, optical disk or Compact Disc Read-Only Memory (CD-ROM). Magnetic surface memory can be magnetic disk memory or magnetic tape memory. Volatile memory can be Random Access Memory (RAM), which is used as an external cache. By way of example, and not limitation, many forms of RAM are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM) and Direct Rambus Random Access Memory (DRRAM). The memory described in the embodiment of the application of the systems is intended to include, but is not limited to, these and any other suitable types of memory.

In an exemplary embodiment, an embodiment of the disclosure further provides a storage medium, that is, a computer storage medium, which can be specifically a computer readable storage medium, such as a memory for storing computer programs, which can be executed by a processor of the cooking apparatus to complete the steps described in the method of the embodiments of the disclosure. The computer programs may be executed by the processor 1601 of the cooking control device 1600 to complete the steps of the above method. The computer readable storage medium can be ROM, PROM, EPROM, EEPROM, Flash Memory, magnetic surface memory, optical disk, CD-ROM or the like.

It should be noted that the terms "first", "second" and the like are used for distinguishing similar objects, and not necessarily for describing a specific sequential or chronological order.

In addition, the technical solutions described in the embodiments of the disclosure may be combined with each other without conflict.

What described above are merely specific implementations of the disclosure, but the scope of protection of the disclosure is not limited thereto. Variations or replacements readily contemplated by any person skilled in the art within the scope of the technology disclosed herein should be included within the scope of protection of the disclosure. Therefore, the protection scope of the disclosure shall be subject to the protection scope defined by the claims.

The invention claimed is:

1. A method for controlling a cooking apparatus comprising:
counting a number of times that an operation temperature of the cooking apparatus exceeds a set temperature within a previous set duration;
determining whether there is a stir-frying operation at the cooking apparatus according to the number of times that the operation temperature of the cooking apparatus exceeds the set temperature within the previous set duration, including:
in response to a fluctuation range of the operation temperature of the cooking apparatus in a current set duration being greater than a fluctuation range of the operation temperature of the cooking apparatus in the previous set duration, and a number of times that the operation temperature of the cooking apparatus exceeds the set temperature within the current set duration being greater than the number of times that the operation temperature of the cooking apparatus exceeds the set temperature within the previous set duration, determining that there is a stir-frying operation at the cooking apparatus;

in response to determining that there is a stir-frying operation at the cooking apparatus, updating a control parameter corresponding to the current set duration; and
controlling a heating device of the cooking apparatus to heat within the current set duration based on the updated control parameter.

2. The method of claim 1, wherein counting the number of times that the operation temperature of the cooking apparatus exceeds the set temperature within the previous set duration includes:
responsive to determining that the operation temperature of the cooking apparatus is greater than the set temperature, increasing a count of a counter by one; and
determining the number of times that the operation temperature of the cooking apparatus exceeds the set temperature within the previous set duration according to the count of the counter within the previous set duration.

3. The method of claim 1, wherein updating the control parameter corresponding to the current set duration includes:
in response to the number of times that the operation temperature of the cooking apparatus exceeds the set temperature within the current set duration being less than or equal to a set number, determining that the cooking apparatus is in a first state, and setting the control parameter to a set value corresponding to the first state; or
in response to the number of times that the operation temperature of the cooking apparatus exceeds the set temperature within the current set duration being greater than the set number, determining that the cooking apparatus is in a second state, and setting the control parameter to a set value corresponding to the second state.

4. The method of claim 1, wherein updating the control parameter corresponding to the current set duration includes:
determining the control parameter corresponding to the current set duration according to a mapping table of a mapping relation between the number of times and the control parameter.

5. A cooking control method comprising:
receiving an instruction configured to instruct a cooking apparatus to cook;
responsive to the instruction, determining at least one cooking curve corresponding to a cooking process indicated by the instruction, the at least one cooking curve characterizing correspondences between a cooking time, a cooking temperature, and a heating power, and each of the at least one cooking curve including at least two temperature ranges and the heating power corresponding to each of the at least two temperature ranges;
monitoring a cooking parameter of the cooking apparatus, the cooking parameter including a cooking time parameter and a cooking temperature parameter;
counting a number of times that an operation temperature of the cooking apparatus exceeds a set temperature within a previous set duration;
determining whether there is a stir-frying operation at the cooking apparatus according to the number of times that the operation temperature of the cooking apparatus exceeds the set temperature within the previous set duration, including:
in response to a fluctuation range of the operation temperature of the cooking apparatus in a current set duration being greater than a fluctuation range of the operation temperature of the cooking apparatus in the previous set duration, and a number of times that the operation temperature of the cooking apparatus exceeds the set temperature within the current set duration being greater than the number of times that the operation temperature of the cooking apparatus exceeds the set temperature within the previous set duration, determining that there is a stir-frying operation at the cooking apparatus;

in response to determining that there is a stir-frying operation at the cooking apparatus, updating a control parameter corresponding to the current set duration;

determining the heating power of the cooking apparatus based on the monitored cooking parameter and the at least one cooking curve; and controlling the cooking apparatus to cook at the determined heating power and based on the updated control parameter.

6. The method of claim 5, wherein the instruction is a first instruction;

the method further comprising, before receiving the instruction:

outputting at least one recipe;

receiving a second instruction determined based on the at least one recipe, the second instruction being generated after one recipe is selected from the at least one recipe; and responsive to the second instruction, outputting cooking food information matching the one recipe corresponding to the second instruction;

wherein the first instruction is triggered after preparation of a cooked food corresponding to the output cooking food information is completed, and the cooking process indicated by the first instruction is a cooking process corresponding to the one recipe corresponding to the second instruction.

7. The method of claim 5, wherein:

the at least one cooking curve is at least one of at least two cooking curves corresponding to the cooking process indicated by the instruction, each of the at least two cooking curves corresponding to a respective cooking stage;

determining the at least one cooking curve corresponding to the cooking process indicated by the instruction includes determining an order of use of the at least two cooking curves, the order of use characterizing an order of the respective cooking stages in the cooking process; and determining the heating power of the cooking apparatus includes:

determining a currently used cooking curve from the at least two cooking curves based on:

the determined order of use; or another received instruction; and determining the heating power of the cooking apparatus based on the monitored cooking parameter and the determined currently used cooking curve.

8. The method of claim 7, wherein determining the currently used cooking curve from the at least two cooking curves based on the determined order of use includes:

determining one cooking curve corresponding to a current cooking time parameter from the at least two cooking curves based on the monitored cooking parameter and the determined order of use, and determining the one cooking curve as the currently used cooking curve.

9. The method of claim 7, further comprising:

responsive to determining the monitored cooking parameter satisfying a preset condition, determining that a cooking stage corresponding to the currently used cooking curve has been completed, and controlling the cooking apparatus to enter a next cooking stage; or controlling the cooking apparatus to stop cooking to complete the cooking process indicated by the instruction.

10. The method of claim 9, wherein determining the monitored cooking parameter satisfying the preset condition includes at least one of:

determining that the monitored cooking time parameter reaches a time threshold contained in the currently used cooking curve; or determining that the monitored cooking temperature parameter exceeds a temperature threshold contained in the currently used cooking curve.

11. The method of claim 5, wherein determining the heating power of the cooking apparatus includes:

determining a temperature range to which the monitored cooking temperature parameter belongs based on the at least two temperature ranges contained in a currently used cooking curve;

determining a heating power corresponding to the temperature range to which the monitored cooking temperature parameter belongs based on the heating power corresponding to each of the at least two temperature ranges contained in the currently used cooking curve; and using the determined heating power as the heating power of the cooking apparatus.

12. A method for controlling a cooking apparatus comprising:

counting a number of times that an operation temperature of the cooking apparatus exceeds a set temperature within a previous set duration;

determining whether there is a stir-frying operation at the cooking apparatus according to the number of times that the operation temperature of the cooking apparatus exceeds the set temperature within the previous set duration, including:

in response to a fluctuation frequency of the operation temperature of the cooking apparatus in a current set duration being greater than a fluctuation frequency of the operation temperature of the cooking apparatus in the previous set duration, and a number of times that the operation temperature of the cooking apparatus exceeds the set temperature within the current set duration being greater than the number of times that the operation temperature of the cooking apparatus exceeds the set temperature within the previous set duration, determining that there is a stir-frying operation at the cooking apparatus;

in response to determining that there is a stir-frying operation at the cooking apparatus, updating a control parameter corresponding to the current set duration; and controlling a heating device of the cooking apparatus to heat within the current set duration based on the updated control parameter.

* * * * *